(12) United States Patent
Shimada et al.

(10) Patent No.: US 7,469,271 B2
(45) Date of Patent: Dec. 23, 2008

(54) SYSTEM, METHOD, PROGRAM AND STORAGE MEDIUM FOR PROVIDING SERVICE

(75) Inventors: Naoki Shimada, Tokyo (JP); Takahiro Onsen, Kanagawa (JP); Masahiro Hadano, Kanagawa (JP); Koji Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 827 days.

(21) Appl. No.: 10/364,833

(22) Filed: Feb. 11, 2003

(65) Prior Publication Data
US 2003/0154373 A1   Aug. 14, 2003

(30) Foreign Application Priority Data
Feb. 12, 2002   (JP)   .............................. 2002-034008

(51) Int. Cl.
G06F 15/16   (2006.01)
(52) U.S. Cl. .................. 709/206; 709/207; 709/217; 709/228; 707/10
(58) Field of Classification Search ......... 709/203–207, 709/223–226, 217; 710/8–10; 707/10
See application file for complete search history.

(56) References Cited

U.S. PATENT DOCUMENTS

| | | | | |
|---|---|---|---|---|
| 6,356,909 B1* | 3/2002 | Spencer | ....................... | 707/10 |
| 6,393,434 B1* | 5/2002 | Huang et al. | ................. | 707/200 |
| 6,404,884 B1* | 6/2002 | Marwell et al. | ........ | 379/265.13 |
| 6,564,261 B1* | 5/2003 | Gudjonsson et al. | ........ | 709/227 |
| 6,748,367 B1* | 6/2004 | Lee | .............................. | 705/66 |
| 6,820,125 B1* | 11/2004 | Dias et al. | ................... | 709/229 |
| 6,950,857 B1* | 9/2005 | Arnold | ........................ | 709/217 |
| 7,016,875 B1* | 3/2006 | Steele et al. | .................. | 705/44 |
| 7,062,025 B2* | 6/2006 | Summers et al. | ....... | 379/202.01 |
| 7,069,444 B2* | 6/2006 | Lowensohn et al. | ......... | 713/185 |
| 7,076,526 B2* | 7/2006 | Shirakawa | ................... | 709/206 |
| 7,082,535 B1* | 7/2006 | Norman et al. | ............. | 713/163 |
| 7,194,419 B2* | 3/2007 | Robertson et al. | .............. | 705/8 |
| 7,383,304 B2* | 6/2008 | Shimada et al. | ............. | 709/206 |
| 2002/0099942 A1* | 7/2002 | Gohl | ......................... | 713/169 |
| 2002/0138582 A1* | 9/2002 | Chandra et al. | ............. | 709/206 |
| 2002/0154178 A1* | 10/2002 | Barnett et al. | ............... | 345/853 |
| 2003/0084165 A1* | 5/2003 | Kjellberg et al. | ............ | 709/227 |
| 2004/0073869 A1* | 4/2004 | Douvikas et al. | ............ | 715/507 |
| 2004/0267971 A1* | 12/2004 | Seshadri | ........................ | 710/8 |
| 2006/0212585 A1* | 9/2006 | Eaton et al. | ................. | 709/227 |
| 2007/0041555 A1* | 2/2007 | Marwell et al. | ........ | 379/218.01 |

* cited by examiner

Primary Examiner—David E England
(74) Attorney, Agent, or Firm—Morgan & Finnegan, LLP

(57) ABSTRACT

The present invention is to perform authentication to enable linkage among a plurality of different applications providing a service. For example, an authentication server of an embodiment of the present invention is an authentication sever shared among a plurality of different applications providing a service by using the WWW, which is configured to perform user authentication in response to a request from one of the applications, to determine whether an authentication ID associated with a user who succeeded in the authentication is stored in an authentication database, which stores an authentication ID and user's status-of-use information associated with each other, if the authentication succeeded, and to inform the application, which requested for the user authentication, of user's status-of-use information associated with the stored authentication ID to cause the application to perform a process according to the status-of-use information, if the authentication ID associated with the user is determined to be stored.

3 Claims, 29 Drawing Sheets

FIELD 1: ID OF REGISTERED USER
FIELD 2: DOMAIN OF REGISTERED USER
FIELD 3: NAME OF REGISTERED USER
FIELD 4: CELLULAR PHONE NUMBER OF REGISTERED USER
FIELD 5: CELLULAR PHONE MAIL ADDRESS OF REGISTERED USER
FIELD 6: SENDER FILTER CHARACTER STRING
FIELD 7: TITLE FILTER CHARACTER STRING
FIELD 8: DATE FOR NUMBER OF DAYS FILTER
FIELD 9: SHORTEST INTERVAL BETWEEN SENDING OF NOTICE PIECES OF MAIL
FIELD 10 NUMBER OF PIECES OF MAIL TO BE ACCUMULATED TO SEND NOTICE MAIL
FIELD 11: SETTING INFORMATION FOR INCOMING NOTICE FUNCTION
FIELD 12: BCC SETTING INFORMATION
FIELD 13: SETTING INFORMATION FOR SENDER FILTER FUNCTION
FIELD 14: SETTING INFORMATION FOR TITLE FILTER FUNCTION
FIELD 15: SETTING INFORMATION FOR NUMBER OF DAYS FILTER FUNCTION
FIELD 16: SETTING INFORMATION FOR SIGNATURE FUNCTION
FIELD 17: DATE OF RECEIVING MAIL FOR THE FIRST TIME AFTER SENDING NOTICE MAIL
FIELD 18: NUMBER OF PIECES OF MAIL RECEIVED AFTER SENDING NOTICE MAIL
FIELD 19: NUMBER OF PIECES OF MAIL RECEIVED UNTIL USER'S LOG IN
FIELD 20: SIGNATURE CHARACTER STRING
FIELD 21: STANDARD SENTENCE 1 CHARACTER STRING
FIELD 22: STANDARD SENTENCE 2 CHARACTER STRING
FIELD 23: STANDARD SENTENCE 3 CHARACTER STRING
FIELD 24: STANDARD SENTENCE 4 CHARACTER STRING
FIELD 25: STANDARD SENTENCE 5 CHARACTER STRING
FIELD 26: STANDARD SENTENCE 6 CHARACTER STRING
FIELD 27: STANDARD SENTENCE 7 CHARACTER STRING
FIELD 28: STANDARD SENTENCE 8 CHARACTER STRING
FIELD 29: STANDARD SENTENCE 9 CHARACTER STRING
FIELD 30: STANDARD SENTENCE 10 CHARACTER STRING

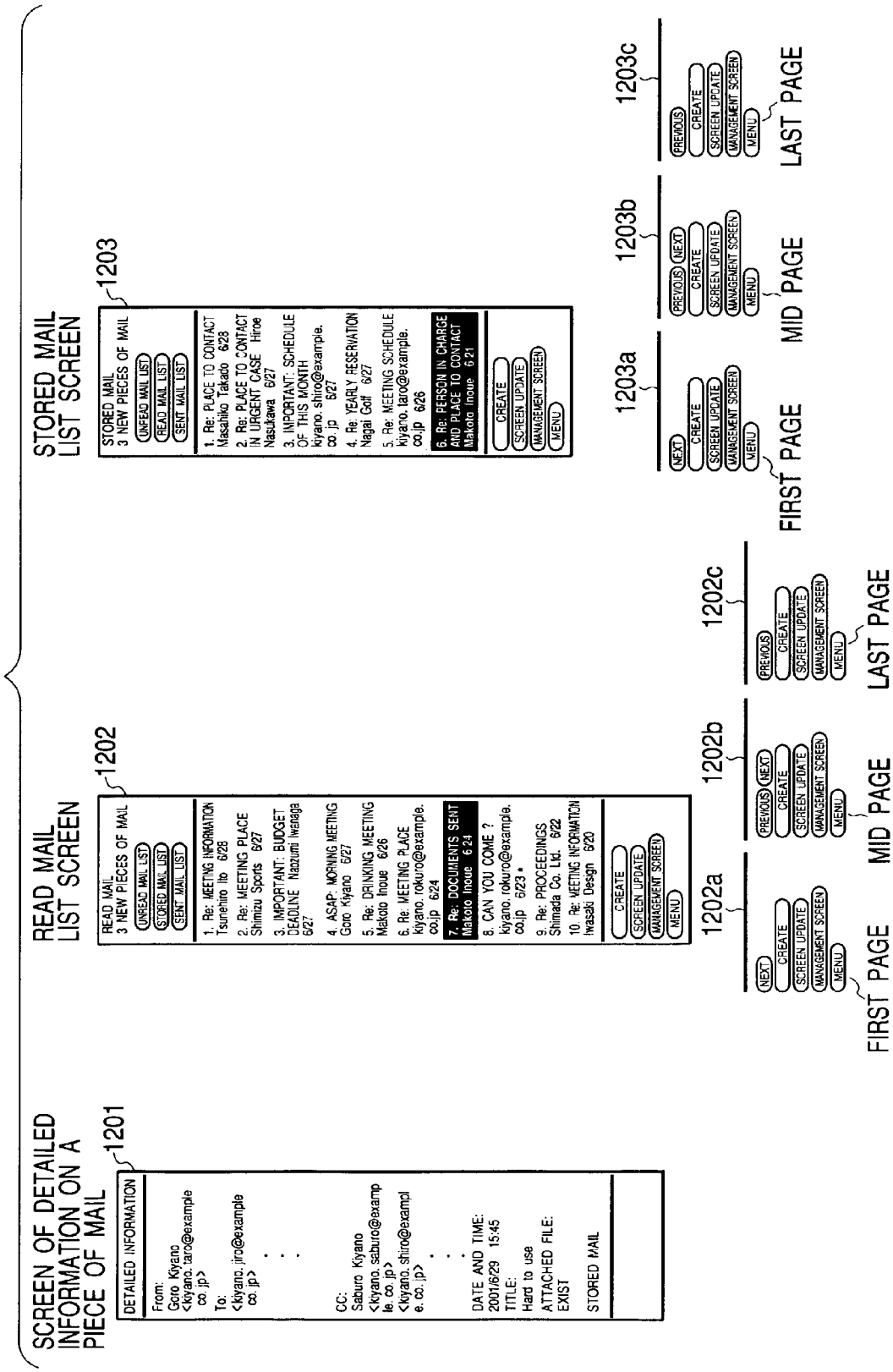

FIG. 14

1401 — TO DESTINATION ADDRESS EDITING SCREEN

TO:
- Taro Kiyano <kiyano.taro@example.co.jp>
- kiyano.jiro@example.co.jp
- kiyano.saburo@example.co.jp
- Shiro Kiyano <kiyano.shiro@example.co.jp>

[ADD DESTINATION] [ADDRESS BOOK REFERENCE] [SENDING SCREEN]

1402 — CC DESTINATION ADDRESS EDITING SCREEN

CC:
- Rokuro Kiyano <kiyano.rokuro@example.co.jp>
- kiyano.saburo@example.co.jp

[ADD DESTINATION] [ADDRESS BOOK REFERENCE] [SENDING SCREEN]

1403 — CELL-PHONE MAIL ADDRESS MANUAL EDITING SCREEN

NAME: Goro Kiyano
ADDRESS: kiyano.goro@example.co.jp

◉ DESTINATION
○ DESTINATION/ADDRESS BOOK

[ADD]

[RETURN]

1404 — ADDRESS BOOK ADDING SCREEN OF CELL-PHONE MAIL ADDRESS

DESTINATION/ADDRESS BOOK ADDITION

NAME: Goro Kiyano
PHONETIC EXPRESSION: KI-YA-NO GO-RO
MAIL ADDRESS: kiyano.goro@example.co.jp

☑ PERSONAL ADDRESS BOOK
☐ COMMON ADDRESS BOOK

[ADD] [STOP]

FIG. 18

1801 PERSONAL ADDRESS BOOK LIST SCREEN

ADDRESS BOOK (PERSONAL)
(TO A COMMON)
REGISTERED: 45  (REGISTER)
(SEARCH) (A)(KA)(SA)(TA)(NA)(HA)
(MA)(YA)(RA)(WA)(A)
Shiro Kiyano
Fujibayashi Industrial
Mitsumoto Electric
Jiro Kiyano
Santorii
(MENU)

1802 PERSONAL ADDRESS BOOK VIEWING SCREEN

ADDRESS BOOK (PERSONAL)
Shiro Kiyano
KI-YA-NO SHI-RO
Kiyano Co. Ltd.
KI-YA-NO KA-BU-SHI-KI-GA-I-SHA
TELEPHONE NUMBER:
012-3456-7891
FAX:
kiyano.shiro@examp
le. co. jp
(EDIT)
(DELETE)

1803 PERSONAL ADDRESS BOOK DELETING SCREEN

ADDRESS BOOK (PERSONAL)
NAME:
Shiro Kiyano
IS IT OK TO DELETE __?
(STOP) (DELETE)

1804 PERSONAL ADDRESS BOOK FOR EACH JAPANESE SYLLABARY LIST SCREEN

ADDRESS BOOK (PERSONAL)
Eiko Abe
Hironobu Araki
Ando Co. Ltd.
Satoru Igeta
Kousuke Ito
Ito foods
Tsunehiro Ito
Inoue electric
Daisuke Inoue
Makoto Inoue
Iwasaki Design
Naozumi Iwanaga
· · · ·
Hajime Ohshima
(NEXT)
(PREVIOUS)
(ADDRESS BOOK)

1805 PERSONAL ADDRESS BOOK REGISTRATION EDITING SCREEN

ADDRESS EDITION (PERSONAL)
REGISTERED: 45
NAME:
Shiro Kiyano
PHONETIC EXPRESSION:
KI-YA-NO SHI-RO
COMPANY NAME:
Kiyano Co. Ltd.
PHONETIC EXPRESSION:
KI-YA-NO KA-BU-SHI-KI-GA-I-SHA
TELEPHONE NUMBER:
012-3456-7890
FAX:
012-3456-7890
ADDRESS:
kiyano.shiro@exam
ple. co. jp
(REGISTER)
(STOP)

1806 PERSONAL ADDRESS BOOK REGISTRATION COMPLETION SCREEN

ADDRESS BOOK (PERSONAL)
NAME:
Shiro Kiyano
REGISTRATION IS COMPLETED.
(ADDRESS BOOK)

1807 ADDRESS BOOK REGISTRATION FAILURE SCREEN

ADDRESS BOOK (PERSONAL)
NAME:
Shiro Kiyano
DUE TO LIMIT ON THE NUMBER OF ADDRESSES, REGISTRATION FAILED.
(ADDRESS BOOK)

FIG. 21

UNREAD MAIL
1 NEW PIECE OF MAIL

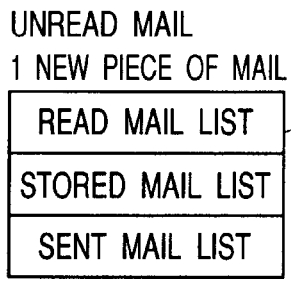

21001

1. (Single byte test, Naoki Shimada 12/27
2. Single byte (test Naoki Shimada 12/27
3. This is a test. Naoki Shimada 12/27
4. This is a "test". Naoki Shimada 12/27
5. Re: PROGRESS REPORT MEETING Shingo Masuda 12/26
6. ATTACHED FILE TEST SHI-MA-DA NA-O-KI 12/26*
7. ATTACHED FILE TEST Naoki Shimada 12/26*
8. HTML ATTACHED FILE Naoki Shimada 12/26*
9. SOLUTION: THE ATTACHED tomato 12/26*
10. "test" (THIS TIME, THE ATTACHED tomato 12/26

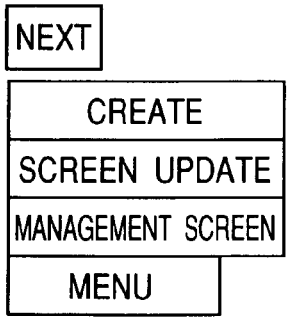

FIG. 22

READ MAIL
1 NEW PIECE OF MAIL

| UNREAD MAIL LIST |
| STORED MAIL LIST |
| SENT MAIL LIST |

1. [TEST] Naoki Shimada 12/27
2. Proper Atsushi Inoue 12/26*
3. Proper Atsushi Inoue 12/26*
4. Proper Atsushi Inoue 12/26*
5. test6 tomato 12/26*
6. test 1500 characters tomato 12/26*
7. test1 tomato 12/26*
8. Sending Time Test shimada@canonet-12/25
9. Fw: [INTERNET Wa Naoki Shimada 12/25
10. Re: Evaluation, etc., murakami@canonet 12/24

| NEXT |

| CREATE |
| SCREEN UPDATE | —22001
| MANAGEMENT SCREEN |
| MENU |

FIG. 23

MANAGEMENT SCREEN

1. INCOMING NOTICE SETTING

2. FILTER SETTING

3. SIGNATURE SETTING

RETURN

FIG. 24

```
<HTML><BODY><PRE>
<FORM ACTION="../MailList;jsessionid=n5658hs401"METHOD="post">UNREAD MAIL<BR>
1 NEW PIECE OF MAIL<BR>
<INPUT TYPE="sumbit"NAME="kidokuB"VALUE="READ MAIL LIST"><BR>
<INPUT TYPE="sumbit"NAME="lockB"VALUE="STORED MAIL LIST"><BR>
<INPUT TYPE="sumbit"NAME="sousinB"VALUE="SENT MAIL LIST"><HR><OL START="1">   24001
    <A HREF="../MailShow;jsessionid=n5658hs401?msgid=9528456593165628&list=1&lp=1"><LI>
    <A HREF="../MailShow;jsessionid=n5658hs401?msgid=8169806104471543&list=1&lp=1">Single byte test, Naoki Shimada 12/27<BR></A><LI>
    <A HREF="../MailShow;jsessionid=n5658hs401?msgid=6215326995495157&list=1&lp=1">Single byte (test test Naoki Shimada 12/27<BR></A><LI>
    <A HREF="../MailShow;jsessionid=n5658hs401?msgid=8556658900954147&list=1&lp=1">This is a test. Naoki Shimada 12/27<BR></A><LI>
    <A HREF="../MailShow;jsessionid=n5658hs401?msgid=1088587985037292668list=1&lp=1">This is a "test". Naoki Shimada 12/27<BR></A><LI>
    <A HREF="../MailShow;jsessionid=n5658hs401?msgid=1613367485606359&list=1&lp=1">Re:PROGRESS REPORT MEETING Shingo Masuda 12/26<BR></A><LI>
    <A HREF="../MailShow;jsessionid=n5658hs401?msgid=7360943342120034&list=1&lp=1">ATTACHED FILE TEST SHI-MA-DA- NA-O-KI 12/26<BR></A><LI>
    <A HREF="../MailShow;jsessionid=n5658hs401?msgid=7812896793874357&list=1&lp=1">ATTACHED FILE TEST Naoki Shimada 12/26<BR></A><LI>
    <A HREF="../MailShow;jsessionid=n5658hs401?msgid=5207068893716704&list=1&lp=1">HTML ATTACHED FILE Naoki Shimada 12/26<BR></A><LI>
    <A HREF="../MailShow;jsessionid=n5658hs401?msgid=7416749035584406&list=1&lp=1">SOLUTION:THE ATTACHED tomato 12/26<BR></A></OL>   <HR>
<INPUT TYPE="hidden"NAME="list"VALUE="1"><INPUT TYPE="hidden"NAME="lp"VALUE="1"><BR>
<INPUT TYPE="sumbit"NAME="createB"VALUE="CREATE"><BR>                           24002
<INPUT TYPE="sumbit"NAME="updateB"VALUE="SCREEN UPDATE"><BR>
<INPUT TYPE="sumbit"NAME="managerB"VALUE="MANAGEMENT SCREEN"><BR>
<INPUT TYPE="sumbit"NAME="menuB"VALUE="MENU">
</FORM>
</PRE></BODY></HTML>
```

FIG. 25

```
<HTML><BODY><PRE>
<FORM ACTION="../MailList;jsessionid=n5658hs401"METHOD="post">UNREAD MAIL<BR>
1 NEW PIECE OF MAIL<BR> <INPUT TYPE="sumbit"NAME="midokuB"VALUE="UNREAD MAIL LIST"><BR>
<INPUT TYPE="sumbit"NAME="lockB"VALUE="STORED MAIL LIST"><BR>
<INPUT TYPE="sumbit"NAME="sousinB"VALUE="SENT MAIL LIST"><HR><OL START="1"><LI>  ——25001
<A HREF="../MailShow;jsessionid=n5658hs401?msgid=1761558837872877&list=2&lp=1">[TEST] Naoki Shimada 12/27<BR></A><LI>
<A HREF="../MailShow;jsessionid=n5658hs401?msgid=2497733316322599&list=2&lp=1">Proper Atsushi Inoue 12/26&63722;<BR></A><LI>
<A HREF="../MailShow;jsessionid=n5658hs401?msgid=4803163191103646&list=2&lp=1">Proper Atsushi Inoue 12/26&63722;<BR></A><LI>
<A HREF="../MailShow;jsessionid=n5658hs401?msgid=5054380797770999&list=2&lp=1">Proper Atsushi Inoue 12/26&63722;<BR></A><LI>
<A HREF="../MailShow;jsessionid=n5658hs401?msgid=4778271034216058&list=2&lp=1">test6 tomato 12/26<BR></A><LI>
<A HREF="../MailShow;jsessionid=n5658hs401?msgid=7436949833476086&list=2&lp=1">test 1500 characters tomato 12/26<BR></A><LI>
<A HREF="../MailShow;jsessionid=n5658hs401?msgid=6750101990185161&list=2&lp=1">test1 tomato 12/26<BR></A><LI>
<A HREF="../MailShow;jsessionid=n5658hs401?msgid=5982844596617076&list=2&lp=1">Sending Time Test Shimada@canonet- 12/25<BR></A><LI>
<A HREF="../MailShow;jsessionid=n5658hs401?msgid=1889316496864547&list=2&lp=1">Fw: [INTERNET Wa Naoki Shimada 12/25<BR></A><LI>
<A HREF="../MailShow;jsessionid=n5658hs401?msgid=6006917476139653&list=2&lp=1">Re: Evaluation, etc., murakami@canonet 12/24<BR></A></OL><HR>
<INPUT TYPE="hidden"NAME="list"VALUE="2"><INPUT TYPE="hidden"NAME="lp"VALUE="1"><INPUT TYPE="sumbit"NAME="nextB"VALUE="NEXT"><BR>
<INPUT TYPE="sumbit"NAME="createB"VALUE="CREATE"><BR>           25002
<INPUT TYPE="sumbit"NAME="updateB"VALUE="SCREEN UPDATE"><BR>
<INPUT TYPE="sumbit"NAME="managerB"VALUE="MANAGEMENT SCREEN"><BR>
<INPUT TYPE="sumbit"NAME="menuB"VALUE="MENU">
</FORM>
</PRE></BODY></HTML>
```

FIG. 26

```
<HTML><BODY>
<FORM ACTION="./Manager;jsessionid=n5658hs401"METHOD="post">MANAGEMENT SCREEN<HR><OL><LI>
    <A HREF="./Manager;jsessionid=n5658hs401?list=2&admin=1&lp=1">INCOMING NOTICE SETTING</A><LI>
    <A HREF="./ManagerFilter;jsessionid=n5658hs401?list=2&admin=1&lp=1">FILTER SETTING</A><LI>
    <A HREF="./EditSignature;jsessionid=n5658hs401?list=2&admin=1&lp=1">SIGNATURE SETTING</A></OL><HR>
<INPUT TYPE="hidden"NAME="list"VALUE="2"><INPUT TYPE="hidden"NAME="lp"VALUE="1">
<INPUT TYPE="hidden"NAME="admin"VALUE="1"><INPUT TYPE="sumbit"VALUE="RETURN">
</FORM>
</BODY></HTML>
```

26001

FIG. 27 menu
- MAIL MANAGEMENT
  - UNREAD MAIL LIST
  - READ MAIL LIST
  - STORED MAIL LIST
  - SENT MAIL LIST
- ▶ PERSONAL ADDRESS BOOK
- ▶ COMMON ADDRESS BOOK
- ▶ REGISTRATION OF BASIC INFORMATION
- ▶ SEND URL
- ▶ OPERATING MANUAL

∴ PERSONAL ADDRESS BOOK ...HELP

EDIT REGISTERED INFORMATION: Naoki Shimada

★ INDICATES A MUST ENTRY.

NAME: [Naoki Shimada]
★ PHONETIC EXPRESSION: [SHI-MA-DA NA-O-KI]
COMPANY NAME: [ ]
PHONETIC EXPRESSION: [ ]
MAIL ADDRESS: [xxx@xxxx.xxxx.co.jp]
TELEPHONE NUMBER: [ ]
FAX: [ ]
MEMO: [ ]

※ SPACE SUBSTITUTES COMMA ",", SINGLE QUOTATION MARK "'", AND DOUBLE QUOTATION MARK """, TO OUTPUT AT ONCE.

[UPDATE] [REENTER] [ADD TO COMMON ADDRESS BOOK] [DELETE]

[RETURN TO COMMON ADDRESS BOOK]

FIG. 28

ADDRESS BOOK (PERSONAL)

NAME
| Naoki Shimada |

PHONETIC EXPRESSION
| SHI-MA-DA NA-O-KI |

COMPANY NAME
| |

PHONETIC EXPRESSION
| |

TELEPHONE NUMBER
| |

FAX
| |

MAIL ADDRESS
| xxx@xxxx.xxxx.co.jp |

[REGISTER]
[STOP]

FIG. 29

```
<HTML><BODY>
<FORM ACTION="../AdressEdit;jsessionid=2ditb72hl1"METHOD="post">ADDRESS BOOK (PERSONAL)<HR>
NAME<BR>
<INPUT TYPE="text"NAME="name"MAXLENGTH="60"VALUE="Naoki Shimada"><BR>
PHONETIC EXPRESSION<BR>
<INPUT TYPE="text"NAME="nayo"MAXLENGTH="120"VALUE="SHI-MA-DA NA-O-KI"><BR>
COMPANY NAME<BR>
<INPUT TYPE="text"NAME="corp"MAXLENGTH="128"VALUE=""><BR>
PHONETIC EXPRESSION<BR>
<INPUT TYPE="text"NAME="coyo"MAXLENGTH="256"VALUE=""><BR>
TELEPHONE NUMBER<BR>
<INPUT TYPE="text"NAME="tel"MAXLENGTH="20"VALUE="""istyle="4"MODE="numeric"><BR>
FAX<BR>
<INPUT TYPE="text"NAME="fax"MAXLENGTH="20"VALUE=""istyle="4"MODE="numeric"><BR>
MAIL ADDRESS<BR>
<INPUT TYPE="text"NAME="adid"MAXLENGTH="50"VALUE="xxx@xxxx.xxxx.co.jp"istyle="3"MODE="alphabet"><BR>
<INPUT TYPE="hidden"NAME="phki"VALUE="1"><HR>
<INPUT TYPE="hidden"NAME="opad"VALUE="3">
<INPUT TYPE="sumbit"NAME="edit"VALUE="REGISTER"><BR>
<INPUT TYPE="sumbit"NAME="abort"VALUE="STOP">
</FORM></BODY>
</HTML>
```

SYSTEM, METHOD, PROGRAM AND STORAGE MEDIUM FOR PROVIDING SERVICE

BACKGROUND OF THE INVENTION

The present invention relates to linkage among a plurality of application programs that configures a service providing system for providing a service by means of the WWW.

As the Internet has become widespread in recent years, electronic mail has become commonplace as a communication tool with an information processor such as a personal computer or a piece of e-mail-specific terminal.

At the same time, there have been problems in such a case that a user who employs e-mail by means of an information processor placed at the user's office cannot manipulate the e-mail away from the office.

To enable a user to employ e-mail away from the user's office or house, a system for forwarding a piece of e-mail to an e-mail address which is available from the user's wireless mobile terminal was devised in Japanese Patent Application Laid-Open No. 2000-244556. However, the above-mentioned e-mail forwarding system has a limit on size or the number of characters of a piece of e-mail to be forwarded depending on the type of destined mobile terminal (e.g., a cellular phone). Accordingly, when a piece of e-mail to be sent is too large, only the beginning, part is forwarded or the whole piece of mail is forwarded by being divided into many pieces.

Another WWW (World Wide Web) mail system devised employs e-mail from a personal computer through a WWW browser instead of through e-mail specific application. In the WWW mail system, a user employs e-mail through a WWW browser.

Next, a conventional e-mail system will be described.

Conventional E-Mail System

FIG. 2 is a block diagram of a conventional e-mail system with a personal computer.

Reference numeral 201 denotes client 1 which is a personal computer connected to an e-mail system over the Internet. Client 1 includes an MUA (Mail User Agent) program for reading/writing a piece of e-mail and an MTA (Message Transfer Agent) program for distributing a piece of e-mail.

Reference numeral 202 denotes client 2 which is a personal computer connected to an e-mail system over the Internet. Client 2 includes an MUA program which is a mailer program for reading/writing a piece of e-mail. A user can create a piece of e-mail by controlling an MUA program on client 2 and request an MTA program running on a mail server 206 of an e-mail system to distribute the piece of e-mail.

A user can also access an e-mail system through POP (Post Office Protocol) or IMAP protocol, capture and view a piece of e-mail for the user existing in the e-mail system by controlling a mailer (MUA program) on client 2.

Client 2 also includes a WWW browser which is represented as Netscape Navigator (trademark) and the like. A user can access a WWW server in an e-mail system and perform a user registration process and an address book process by controlling a WWW browser.

Reference numeral 203 denotes considered to be a network using such communication network as a public telephone line, ISDN, and satellite communication network.

Reference numeral 204 denotes an e-mail system which is composed of a WWW server, a mail server, a database server and a charge server. The system provides a user with an e-mail service. The servers are respectively connected via a Local Area Network (referred to as LAN hereinafter) and can communicate data with each other.

Reference numeral 205 denotes a WWW server, which includes an authentication program, a user registration program, an address book program, and an account generation program. When a user controls a WWW browser and accesses the WWW server, the WWW server generates various WWW screens and sends them to the WWW browser. The user can make respective requests for the WWW server by viewing and manipulating the sent WWW screens.

The WWW server which received the user's request over the WWW starts each program and performs each process.

The authentication program 205a is a program for performing user authentication when a user accesses a WWW server by controlling a WWW browser. The user views a sent authentication screen and enters a user ID and a password which are required for authentication. Then the authentication program performs authentication by referring to user information data in a user information database. If the authentication fails, the authentication program displays an authentication error screen. If the authentication succeeds, the authentication program generates an authentication ID and stores the authentication ID in association with the user ID into an authentication database. At this moment, a timer for the authentication ID is set to a specific time period. When a predetermined time period set for this authentication ID timer elapses, the stored authentication ID is deleted from the database.

When the user accesses the WWW server again by controlling a WWW browser after having an authentication ID generated, the authentication program checks whether the generated authentication ID exists in DB. If the authentication ID exists in the DB, the previous authentication is determined to be valid and the access is permitted without performing any user authentication. If the authentication ID does not exist in the DB, the authentication ID is determined to be invalid and an authentication screen for retrying user authentication is displayed.

The user registration program 205b is a program to generate a user information registration screen for a user to set the start or end of the employment of the e-mail system or to register user information when the user accesses a URL for user registration of the WWW server by controlling a WWW browser.

When the user views an information registration screen and directs to start employing the e-mail system, the user registration program issues and stores a user ID, a password and an e-mail address for employing the e-mail service into a user information database. Then the user registration program starts the account generation program.

When the user views an information registration screen and directs to finish employing the e-mail system, the user registration program starts the account generation program, while deleting a user ID, a password and an e-mail address which has been used by the user from a user information database.

In addition, the user registration program resets an authentication ID timer each time the user controls the system.

The address book program 205c is a program to generate an address book screen for a user to edit or view an address book when the user accesses a URL for address book of the WWW server by controlling a WWW browser.

The address book program stores data on a specific person's name, a telephone number and an e-mail address designated by the user in association with each other into an address book database. The address book data is stored in association with each other for each user ID. The maximum number of address book data pieces allowed for each user to register can be set to a predetermined number.

In addition, the address book program resets an authentication ID timer each time the user controls the system.

The account generation program 205*d* is a program for causing a mail server to generate an e-mail account for a user when the user accesses a URL for user registration of a WWW server by controlling a WWW browser and directs to start employing the e-mail system. The account generation program is also used for deleting the user's e-mail account in the mail server when the user accesses a URL for user registration of a WWW server by controlling a WWW browser and directs to finish employing the e-mail system.

When generation of an e-mail account completes, the account generation program starts a charge program running on a charge server.

The mail server 206 is composed of an MTA program and a POP/IMAP program.

The MTA program 206*a* is a program for performing management of a mail account for a user who employs the e-mail system and for processing a piece of e-mail for a user who employs the e-mail system. The MTA program receives a piece of e-mail distributed over a communication network for a user who employs the e-mail system and stores the piece of e-mail into a data storage area on a mail server, which is referred to as "mail spool". At this moment, the MTA program sorts and stores the received piece of e-mail for each user (for each e-mail address).

The maximum capacity for a mail storage area of a mail spool is set for each user. When an amount of storage for a user reaches its maximum capacity, the MTA program stops storing a piece of new e-mail for the user and returns the piece of e-mail to its source.

206*b* is a POP/IMAP program. When a user accesses the e-mail system through a protocol such as POP (Post Office Protocol) or IMAP (Internet Message Accesses Protocol) by controlling the MUA program, a POP/IMAP program passes a piece of mail stored in a mail spool of a mail server to MUA.

When a user performs a sending process of a piece of e-mail by controlling an MUA program, the MUA program requests the MTA program to distribute the piece of e-mail. The MTA program which received the request distributes the piece of e-mail created by the user through SMTP (simple mail transfer protocol).

A database server 207 is composed of a user information database, an address book database and an authentication database.

The user information database 207*a* stores a user ID, a password, and an e-mail address of a user who employs the e-mail system.

The address book database 207*b* stores an address book for each user who employs the e-mail system. The address book stores data such as a specific person's name, a telephone number and an e-mail address, which are designated for registration.

The authentication database 207*c* stores an authentication ID generated by an authentication program.

The charge server 208 is composed of a charge program and a charge database.

When a user directs to start employing the e-mail system with a user registration program, the charge program 208*a* stores a set date and time as a date and time for service to start in a charge DB. The charge program 208*a* is also a program for storing a set date and time as a date and time for service to end in a charge database when a user directs to finish employing the e-mail system with a user registration program. With the charge program, the charge server calculates the number of days from the starting date and time to the ending date and time for each user who employs the e-mail system and calculates a charge of the e-mail system.

The charge database 208*b* stores the dates and times to start and end the service for a user who employs the e-mail system.

SUMMARY OF THE INVENTION

The present invention enables one to employ the WWW mail system from a browser implemented in a mobile terminal such as a cellular phone. Most mailing functions incorporated in a cellular phone as standard have strict restrictions on the number of characters for a piece of e-mail owing to VRAM in the cellular phone. The present embodiment eliminates such severe restrictions on the number of characters and the like by employing a WWW browser to implement an e-mail function thereby improving the system usability. However, there was a need for linkage among different applications, for example, to change a screen, when an e-mail system is configured with many different applications as in the embodiments of the present invention described below. There was also a problem in providing different devices (PC, cellular phone, etc.,) with an e-mail system; that each device independently authenticates and manages a user resulting in complicated user management.

To solve the above-mentioned problem, for example, a service providing method of one embodiment of the present invention is a service providing method for controlling a service providing system including a plurality of different applications providing a service by using the WWW, and an authentication server shared among the applications, wherein the service providing method causes-an authentication step for authenticating a user in response to a request from one of the applications, a determination step for determining whether an authentication ID associated with a user who succeeded in an authentication is stored in an authentication database, which stores an authentication ID and user's status-of-use information associated with each other, if the authentication succeeded in the authentication step, and an information step for informing the application, which requested for the user authentication, of user's status-of-use information associated with the stored authentication ID to cause the application to perform a process according to the status-of-use information, if the authentication ID associated with the user is determined to be stored in the authentication server.

To solve the above-mentioned problem, for example, a service providing method of one embodiment of the present invention is a service providing method for controlling an authentication server shared among a plurality of different applications providing a service by using the WWW, comprising an authentication step for authenticating a user in response to a request from one of the applications, a determination step for determining whether an authentication ID associated with a user who succeeded in the authentication is stored in an authentication database, which stores an authentication ID and user's status-of-use information associated with each other, if the authentication succeeded in the authentication step, and an information step for informing the application, which requested for the user authentication, of user's status-of-use information associated with the stored authentication ID to cause the application to perform a process according to the status-of-use information, if the authentication ID associated with the user is determined to be stored.

To solve the above-mentioned problem, for example, a service providing system of one embodiment of the present invention is a service providing system including a plurality of different applications for providing a service by using the WWW and an authentication server shared among the applications, comprising an authentication means for authenticating a user in response to a request from the applications, a determination means for determining whether an authentication ID associated with a user who succeeded in the authentication is stored in an authentication database, which stores an authentication ID and user's status-of-use information associated with each other, if the authentication succeeded by the authentication means, and an information means for informing the application, which requested for the user authentication, of user's status-of-use information associated with the stored authentication ID to cause the application to perform a process according to the status-of-use information, if the authentication ID associated with the user is determined to be stored.

To solve the above-mentioned problem, for example, an authentication server of one embodiment of the present invention is an authentication server shared among a plurality of different applications providing a service by using the WWW, comprising an authentication means for authenticating a user in response to a request from one of the applications, a determination means for determining whether an authentication ID associated with a user who succeeded in the authentication is stored in an authentication database, which stores an authentication ID and user's status-of-use information associated with each other, if the authentication succeeded by the authentication means, and an information means for informing the application, which requested for the user authentication, of user's status-of-use information associated with the stored authentication ID to cause the application to perform a process according to the status-of-use information, if the authentication ID associated with the user is determined to be stored.

Other features and advantages of the patent invention will be apparent from the following description taken in conjunction with the accompanying drawings, in which like reference characters designate the same or similar parts throughout the figure thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram showing a cell-phone user information registration screen;

FIG. 7 is a diagram illustrating a cell-phone user information data storage area;

FIG. 12 is a display screen to be shown on a cellular phone;

FIG. 13 is a display screen to be shown on a cellular phone;

FIG. 14 is a display screen to be shown on a cellular phone;

FIG. 18 is a display screen to be shown on a cellular phone;

FIG. 21 is an example of an unread mail list screen;

FIG. 22 is an example of a read mail list screen;

FIG. 23 is an exemplary management screen;

FIG. 24 is HTML source code for a screen shown in FIG. 21;

FIG. 25 is HTML source code for a screen shown in FIG. 22;

FIG. 26 is HTML source code for a screen shown in FIG. 23;

FIG. 27 is an address-editing screen on a PC;

FIG. 28 is an address editing screen on a mobile terminal; and

FIG. 29 is HTML source code for a screen shown in FIG. 28.

DESCRIPTION OF THE PREFERRED EMBODIMENTS

First Embodiment

An e-mail system according to a first embodiment of the present invention will now be described in detail.

E-mail System with a Personal Computer and a Cellular Phone

Figure 1:
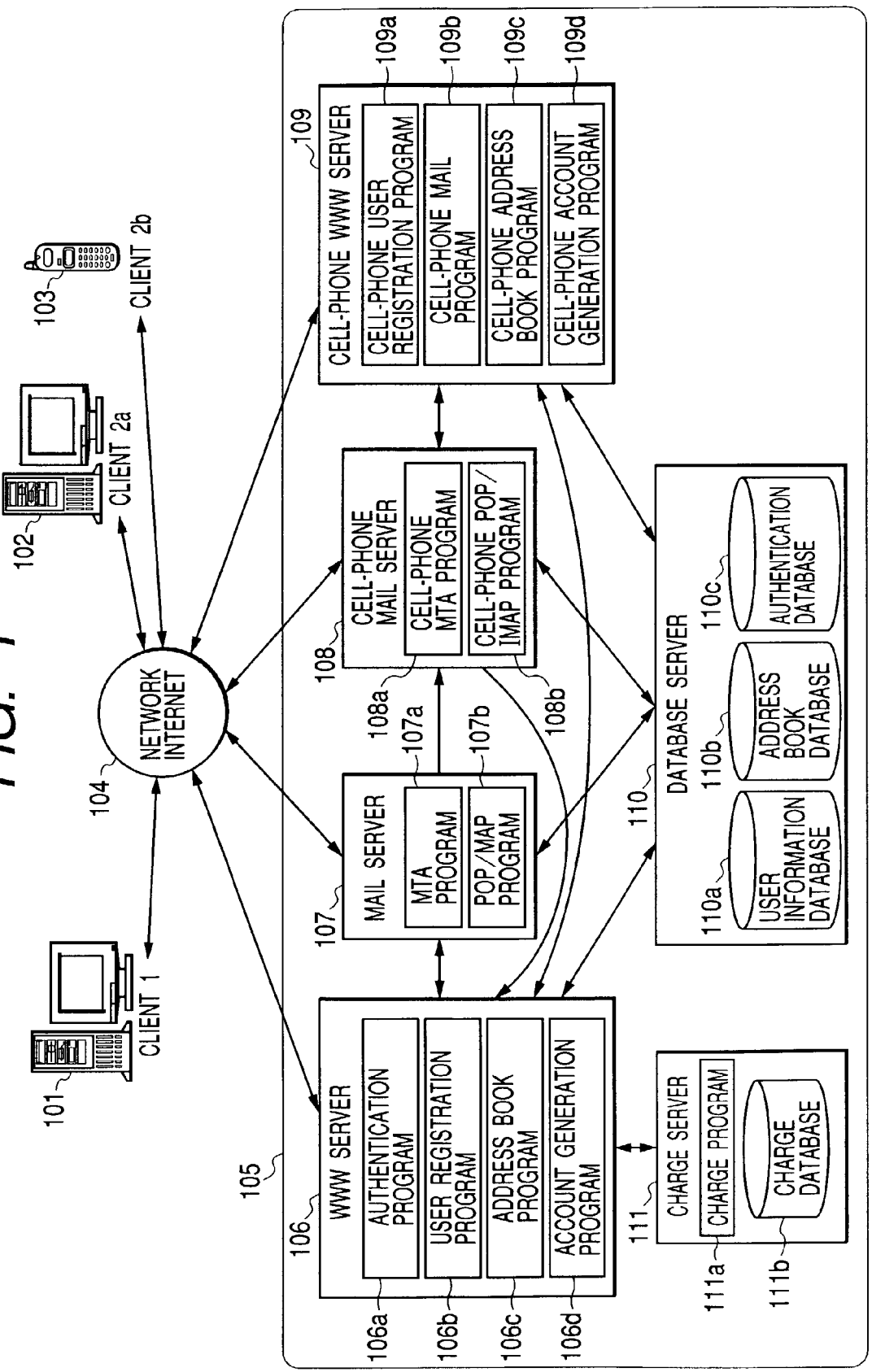
FIG. 1 is a block diagram of an e-mail system showing the present embodiment.
Figure 2:
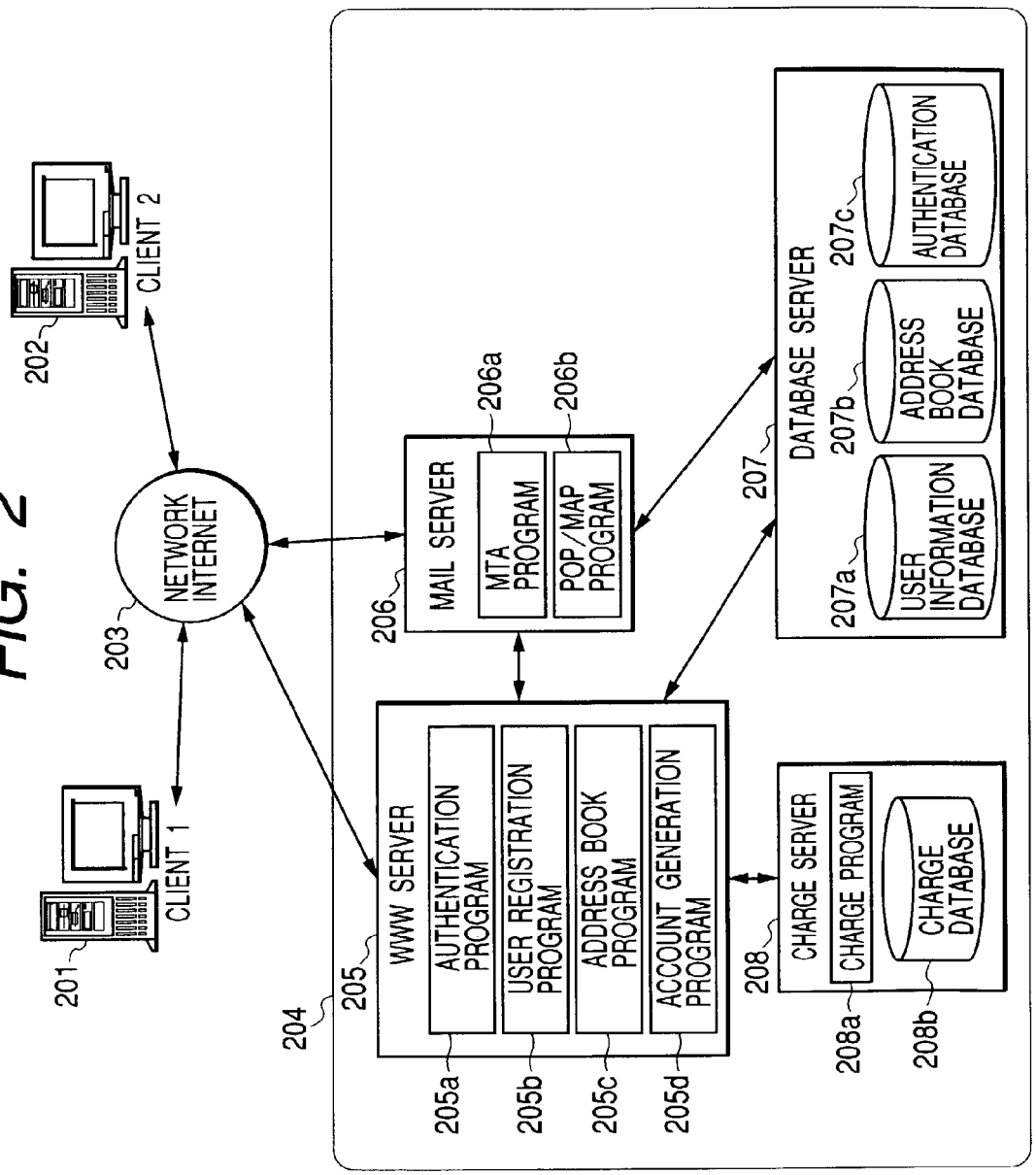
FIG. 2 is a block diagram of a conventional e-mail system.

FIG. 1 is a diagram of a system configuration showing an embodiment of an e-mail system with a personal computer and a cellular phone according to the invention.

An e-mail system with a personal computer and a cellular phone according to the present invention enables one to employ an e-mail system from a cellular phone (referred to as "a cellular phone service" hereinafter) as well as from a personal computer.

In FIG. 1, 101 is client 1, which is a personal computer connected to the e-mail system over the Internet. Client 1 includes an MUA (Mail User Agent) program for reading/writing a piece of e-mail and an MTA (Message Transfer Agent) program for distributing a piece of e-mail.

102 is client 2a, which is a personal computer (PC) connected to the e-mail system over the Internet. Client 2 includes an MUA program which is a mailer program for reading/writing a piece of e-mail. A user can control an MUA program on client 2a to create a piece of e-mail and request an MTA program running on a mail server 206 of the e-mail system to distribute the piece of e-mail.

103 is client 2b, which is a cellular phone including a function provided by a cellular phone company for sending and receiving a piece of e-mail specialized for the cellular phone, a WWW browser function for accessing -a WWW page, and a telephone function. This cellular phone allows a user to employ e-mail via a mail server of the cellular phone company by using a cellular phone-specific e-mail address supplied from the company. A piece of mail sent to such a cellular phone-specific e-mail address is distributed to a user's cellular phone to allow the user to view the mail. In the function for sending and receiving a piece of e-mail specialized for the cellular phone, the number of characters which can be sent and received is considered to be limited to around 200.

104 is considered to be a network using a communication network such as a public telephone line, ISDN, and a satellite communication network (it is considered to be a public line network including a wireless network in the present embodiment).

105 is an e-mail system which is composed of a WWW server, a mail server, a cell-phone WWW server, a cell-phone mail server, a database server and a charge server, providing a user with an e-mail service. The servers are respectively connected via a LAN to communicate data with each other.

106 is the WWW server, which includes an authentication program, a user registration program, an address book program, and an account generation program. When a user accesses the WWW server by controlling a WWW browser, the WWW server generates and sends various WWW screens to the WWW browser. The user can make various requests for the WWW server by viewing and manipulating each of the WWW screens sent to the user.

106a is the authentication program, which is a program for performing user authentication when a user accesses a WWW server by controlling a WWW browser. 106a includes a function for starting various programs by accessing a cell-phone WWW server. When a user views a sent authentication screen and enters a user ID and a password required for authentication, the authentication program performs authentication by referring to user information data in a user information database. If the authentication fails, the authentication program displays an authentication error screen. If the authentication succeeds, the authentication program generates an authentication ID and stores the authentication ID in association with the user ID in an authentication database. At this moment, a timer for the authentication ID is set to a specific time period. When a predetermined time period set for this authentication ID timer elapses, the stored authentication ID is deleted from the database.

When the user accesses again a WWW server by controlling a WWW browser after having the authentication ID generated, the authentication program checks whether the generated authentication ID exists in DB. If the authentication ID exists in DB, the previous authentication is determined to be valid and the access is permitted without performing user authentication. If the authentication ID does not exist in DB, the authentication ID is determined to be invalid and an authentication screen for retrying user authentication is displayed.

106b is the user registration program, which is a program to generate a user information registration screen for a user to perform setting the start or end of employment of an e-mail system and registration of user information when the user accesses a URL for user registration of a WWW server by controlling a WWW browser. When a user views the information registration screen and directs to start employing the e-mail system, the user registration program 106b issues a user ID, a password and an e-mail address for employing the e-mail service and stores them into a user information database. Then the user registration program starts the account generation program. When a user views the information registration screen and directs to finish employing the e-mail system, the user registration program starts the account generation program, while deleting a user ID, a password and an e-mail address which has been used by the user from the user information database.

The user registration program 106b includes a function for enabling a user to set the start or end of employment of the cellular phone service; a function for starting a cell-phone account generation program when a user sets the start of employment of the cellular phone service; and a function for informing a user of a URL for accessing a cell-phone user registration program when the user sets the start of employment of the cellular phone service.

The user registration program resets an authentication ID timer each time the user controls the system.

106c is the address book program, which is a program to generate an address book screen for a user to perform editing and viewing of an address book when the user accesses a URL for address book of a WWW server by controlling a WWW browser.

The address book program stores data on specific person's name, telephone number and e-mail address designated by the user in association with each other into an address book database. The address book data is stored with associated for each user ID, and the maximum number of address book data pieces which is allowed for one user to register is set to a predetermined number.

The address book program resets an authentication ID timer each time the user controls the system.

106d is the account generation program, which is a program for causing a mail server to generate an e-mail account for a user when the user accesses a URL for user registration of a WWW server by controlling a WWW browser of a PC and directs to start employing the e-mail system. The account generation program is also used for deleting a user's e-mail account in the mail server when the user accesses a URL for user registration of a WWW server by controlling a WWW browser and directs to finish employing the e-mail system.

When generation of an e-mail account ends, the account generation program starts the charge program running on the charge server.

107 is a mail server, which is composed of an MTA program and a POP/IMAP program.

107a is an MTA program, which is a program for performing management of a mail account for a user who employs an e-mail system and a process of a piece of e-mail for a user who employs an e-mail system. The MTA program receives a piece of e-mail for a user who employs an e-mail system which is distributed through a communication network and stores the piece of e-mail into a data storage area on a mail server which is referred to as "mail spool". At this moment, the MTA program sorts and stores the received piece of e-mail for each user (for each e-mail address).

The maximum capacity for a mail storage area of a mail spool is set for each user. When an amount of storage for a user reaches its maximum capacity, the MTA program stops storing a new e-mail for the user and returns the piece of e-mail to its source.

The MTA program 107a includes a function to forward a piece of e-mail for a user to a cell-phone e-mail address of the user in a cell-phone mail server 108 when the user sets to use a cell-phone service. The cell-phone e-mail address for a user is generated by a cell-phone account generation program.

107b is a POP or IMAP program. When a user accesses the e-mail system through a protocol such as POP (Post Office Protocol) or IMAP (Internet Message Accesses Protocol) by controlling an MUA program, a POP/IMAP program passes a piece of mail stored in a mail spool of a mail server to the MUA.

When the user controls the MUA program and performs a sending process of a piece of e-mail, the MUA program requests an MTA program of the e-mail system to distribute a piece of e-mail. The MTA program which received the distribution request distributes the piece of e-mail created by the user through SMTP (simple mail transfer protocol).

108 is a cell-phone mail server, which is composed of a cell-phone MTA program, a cell-phone POP, and an IMAP program.

108a is a cell-phone MTA program, which performs both management of a user's mail account which is set to use a cell-phone service and processing of a piece of e-mail.

The cell-phone MTA program receives a piece of e-mail for a user, which is forwarded by an MTA program of a mail server 107 and stores the piece of e-mail into a mail storage area on a mail server which is referred to as a "mail spool".

At this moment, the cell-phone MTA program sorts and stores the received piece of e-mail for each user (for each cell-phone e-mail address). The cell-phone MTA program keeps storing a new e-mail for a user until the entire mail storage area of a mail spool becomes short. The cell-phone MTA program stops storing a new e-mail for a user and returns the piece of e-mail to its source when the entire mail storage area of a mail spool becomes short.

The cell-phone MTA program distributes a piece of e-mail to a designated mail address through SMTP (simple mail transfer protocol) when it is requested to distribute a piece of e-mail by a cell-phone mail program.

108b is a cell-phone POP/IMAP program. When a cell-phone mail program 109b accesses through a POP or IMAP protocol, the cell-phone POP/IMAP program passes a piece of mail stored in a mail spool of a cell-phone server.

109 is a cell-phone WWW server, which includes a cell-phone user registration program, a cell-phone mail program, a cell-phone address book program, and a cell-phone account generation program.

When a user accesses respective URLs for cell-phone service by controlling a WWW browser of a cellular phone, authentication is performed by an authentication program of a WWW server. Then, various WWW screens are generated in a cell-phone WWW server and sent to the WWW browser of the cellular phone. When a user controls a WWW browser of a PC and performs cell-phone user registration, a URL for a cell-phone user registration program of a cell-phone WWW server is called via a WWW server and a cell-phone user registration is performed on a WWW screen sent from the cell-phone WWW server.

A user can make various requests for a cell-phone WWW server by viewing and manipulating a WWW screen, which is sent to a cell-phone WWW browser or PC's WWW browser.

The cell-phone WWW server which received a user's request starts respective programs and performs processing. Various URLs of a cell-phone WWW server include a URL for cell-phone user registration program, a URL for cell-phone mail program, a URL for cell-phone address book program and the like. When such a URL is accessed, authentication is performed by an authentication program of the WWW server at first. If the authentication is determined to succeed, the access to the cell-phone WWW server will be allowed.

109a is the cell-phone user registration program, which is a-program to be called by the authentication program 106a, if authentication of a WWW server succeeds, when a user accesses a URL for cell-phone user registration program by controlling a WWW browser.

The cell-phone user registration program 109a generates a cell-phone user information registration screen and makes registration of user information concerning a cell-phone service performed.

In other words, when a user views a cell-phone user information registration screen, enters respective pieces of user information and directs to register the information, the cell-phone user registration program stores respective pieces of information into a user information database and then informs the user of a URL for cell-phone mail program and a URL for cell-phone address book program.

The cell-phone registration program resets an authentication ID timer each time the user controls the system.

109b is the cell-phone mail program, which is a program to be called by an authentication program 106a, if authentication of a WWW server succeeds, when a user accesses a URL for cell-phone mail program by controlling a cell-phone WWW browser of a cellular phone 103 (client 2b).

The cell-phone mail program 109b generates various screens for cellular phone to process a piece of e-mail and send them to the cell-phone WWW browser. The user can control a cell-phone WWW browser of the cellular phone to view those various screens and direct respective processing of the piece of e-mail.

The cell-phone mail program 109b performs respective processing of the piece of e-mail according to the direction sent by the user.

The cell-phone mail program resets an authentication ID timer each time the user controls the system.

109c is the address book program, which is a program to be called by the authentication program 106a, if authentication of a WWW server succeeds, when a user accesses a URL for cell-phone address book program by controlling a cell-phone WWW browser. of a cellular phone 103 (client 2b)

The cell-phone address book program generates an address book screen for cellular phone to allow a user to edit and view an address book.

The cell-phone address book program provides a common address book which can be shared by a plurality of users and a personal address book which is only available for one user.

The cell-phone address book program associates three pieces of data on a specific person's name, telephone number and e-mail address designated by the user and store the data into either the common address book data storage area or the personal address book data storage area of an address book database.

The address book data is stored in association with each user. The maximum number of address book data pieces which is allowed for one user to register is set to a predetermined number.

The cell-phone address book program resets an authentication ID timer each time the user controls the system.

109d is the cell-phone account generation program, which is a program to be called by a user registration program 106b when a user accesses a URL for user registration of a WWW server by controlling a WWW browser and sets the start of employing of a cellular phone service.

The cell-phone account generation program generates an e-mail account for cellular phone service of a user who starts employing a cellular phone service in the cell-phone mail server 108.

The cell phone account generation program deletes a user's e-mail account for cellular phone service of a cell-phone mail server when the user accesses a URL for user registration of a WWW server by controlling a WWW browser and sets to finish employing a cellular phone service.

When generation of the e-mail account ends, the cell-phone account generation program starts a charge program running on the charge server.

110 is the database server, which is composed of a user information database, an address book database, and an authentication database.

110a is the user information database, which stores a user ID, a password, and an e-mail address for a user who employs the e-mail system as well as various pieces of user information for cellular phone service.

110b is the address book database, which includes a common address book storage area which can be shared by a plurality of users and a personal address book which can be personally used by a user.

110c is the authentication database, which stores an authentication ID generated by the authentication program.

111 is the charge server, which is composed of a charge program and a charge database.

111a is the charge program, which stores a set date and time as a date and time for service to start into the charge DB when a user directs to start employing the e-mail system by using the user registration program. The charge program is also a program for storing a set date and time as a date and time for service to end into the charge database when a user directs to finish employing the e-mail system by using the user registration program. With the charge program, the charge server calculates the number of days from the start date and time to the end date and time of the service for each user who employs an e-mail system and calculates a charge of the e-mail system.

The charge program 111a stores a set date and time as a date and time for service to start into the charge DB when a user sets the start of employing a cellular phone service by using the user registration program. The charge program also stores a date and time of ending a cellular phone service into the charge database when a user sets the end of employing a cellular phone service by using a user registration program.

111b is the charge database, which stores dates and times the service started and ended for a user who employs an e-mail system as well as dates and times the service started and ended for a user who employs a cellular phone service.

Each server included in the embodiment is considered to implement the present invention by reading out a program code from a storage medium which stores each of the above-mentioned programs and performing the program code in a computer (CPU). The program may be stored previously on a storage medium of each server or may be stored on a storage medium within each server via a removable medium or a network. Each server may be composed of a single unit or may be composed of a plurality of devices.

Description of Processes

Processes of the e-mail system with a personal computer (PC) and a cellular phone will now be described.

Description of Registration Process of a User Who Uses PC

First, a flow of a user registration process in creating a mail address which can be used by WWW browser of a PC will now be described with reference to FIG. 3.

Figure 3:
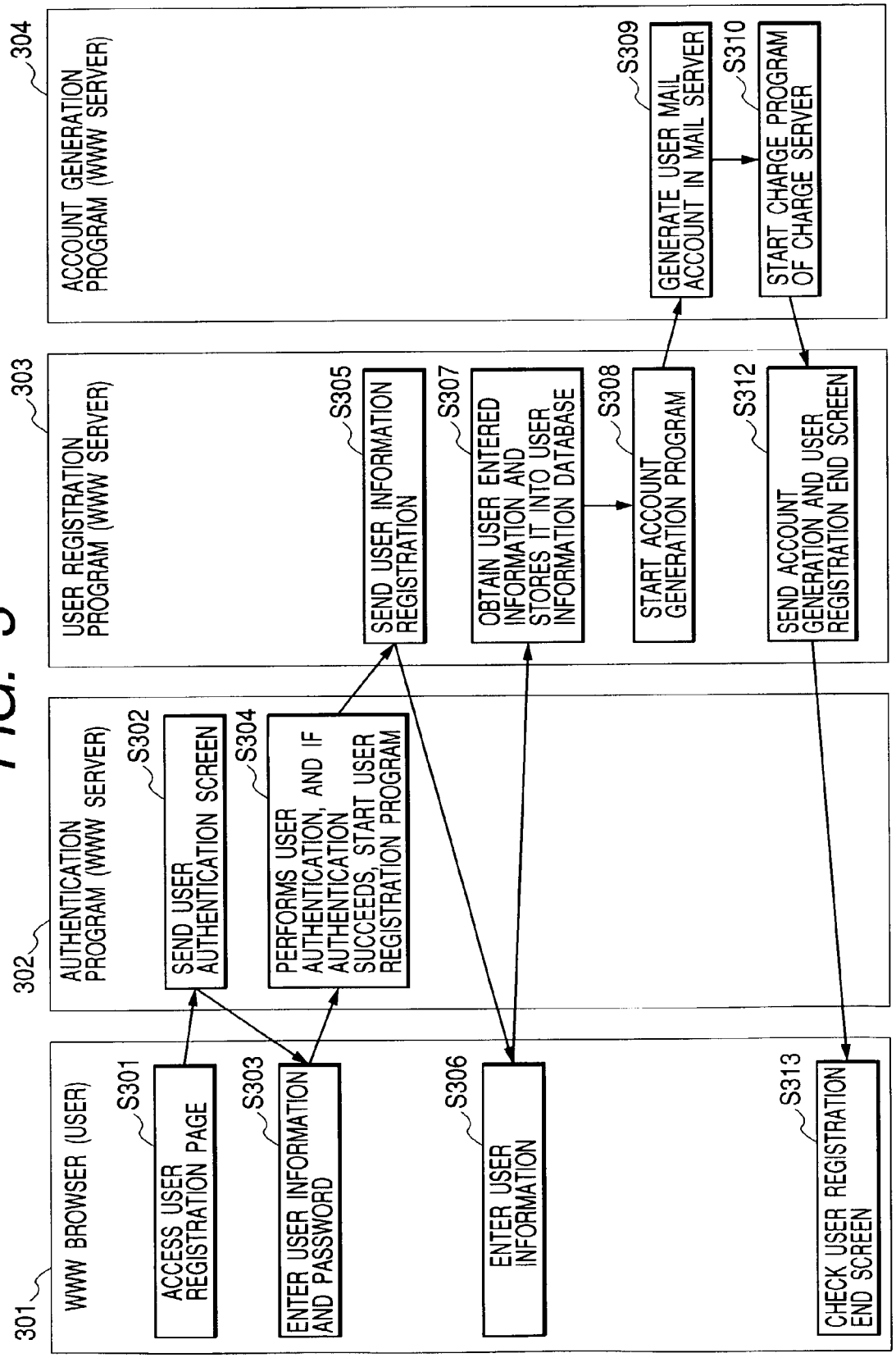
FIG. 3 is a diagram showing a flow of PC user registration process.

In FIG. 3, 301 is a process in a WWW browser running on a PC (client 2a), 302 is a process by authentication program running on a WWW server 106, 303 is a process by user registration program running on a WWW server 106, and 304 is a process by account generation program running on a WWW server 106.

For a specific user (referred to as "User 2" hereinafter) to employ the e-mail system, a user registration process must be performed at first.

At step S301, User 2 accesses the WWW server 106 of the e-mail system by controlling a WWW browser running on the client 2a. Then, at step S302, a user authentication screen is generated and sent to the WWW browser by the authentication program 106a of the WWW server.

At step S303, User 2 views the authentication screen then enters a user ID and a password required for authentication. Then, at step S304, the authentication program performs authentication by referring to user information data within a user information database. If the authentication succeeds, the authentication program generates an authentication ID, stores the authentication ID in association with the user ID into the authentication database, and sets an authentication ID timer to a specific time period. Then the authentication program starts the user registration program, which generates a user information registration page and sends the page to the WWW browser at step S305.

At step S306, User 2 views the user registration page and performs setting of the start of employment of the e-mail system and registration of user information.

At step S307, the user registration program obtains information entered by the user and stores a user ID, a password, and an e-mail address of the user who employs the e-mail service into the user information database. Then, at step S308, the user registration program starts an account generation program.

At step S309, the account generation program generates a user's e-mail account in a mail server. Then, at step S310, the account generation program starts a charge program running on a charge server. At this moment, the charge program stores the set date and time into a charge DB as a date and time of starting the service.

The process continues to step S312, where the user registration program generates an account generation and user registration end screen and sends the screen to the WWW browser.

At step S313, User 2 views and checks the account generation and user registration end screen.

A user can use a WWW browser of a PC to send and receive a piece of e-mail by using an e-mail address registered in the above-mentioned manner. The embodiment also enables a user to view a piece of mail received at the e-mail address on a cellular phone or to generate and send a piece of e-mail from a cellular phone. Processes to make e-mail available from a cellular phone will be described below.

Description of Cell-phone User Registering Processes

A flow of a cell-phone user registration process to make e-mail available by cell-phone WWW browser of a cellular phone will be described with reference to FIGS. 4 and 5.

Figure 4:
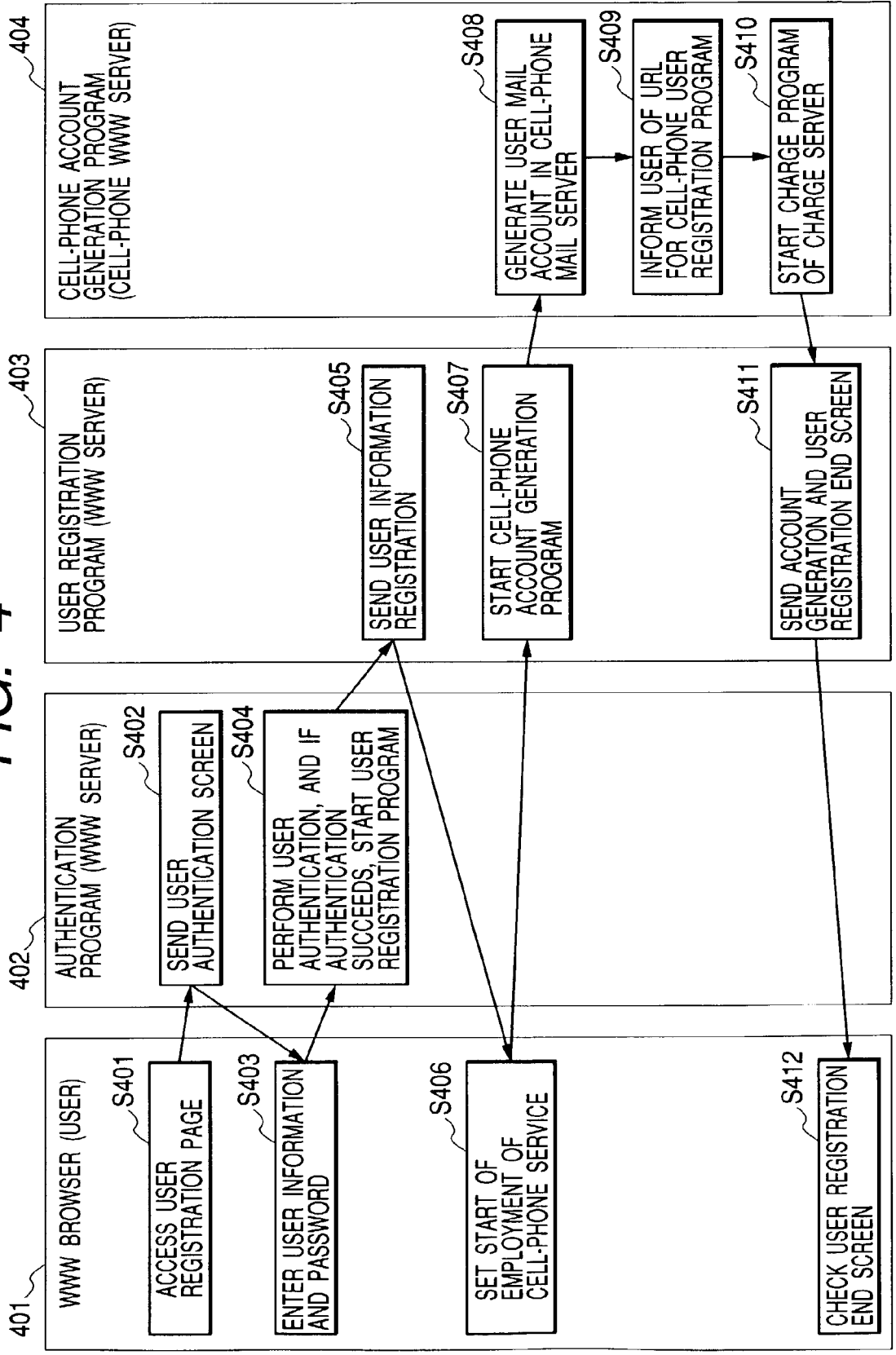
FIG. 4 is a diagram showing a flow of a cell-phone user registration process.

In FIG. 4, 401 is a WWW browser running on the PC 102 (client 2a) shown in FIG. 1, 402 is an authentication program running on the WWW server 106 shown in FIG. 1, 403 is a user registration program running on the WWW server 106 shown in FIG. 1, and 404 is a cell-phone account generation program running on the cell-phone WWW server 109 shown in FIG. 1.

Figure 5:
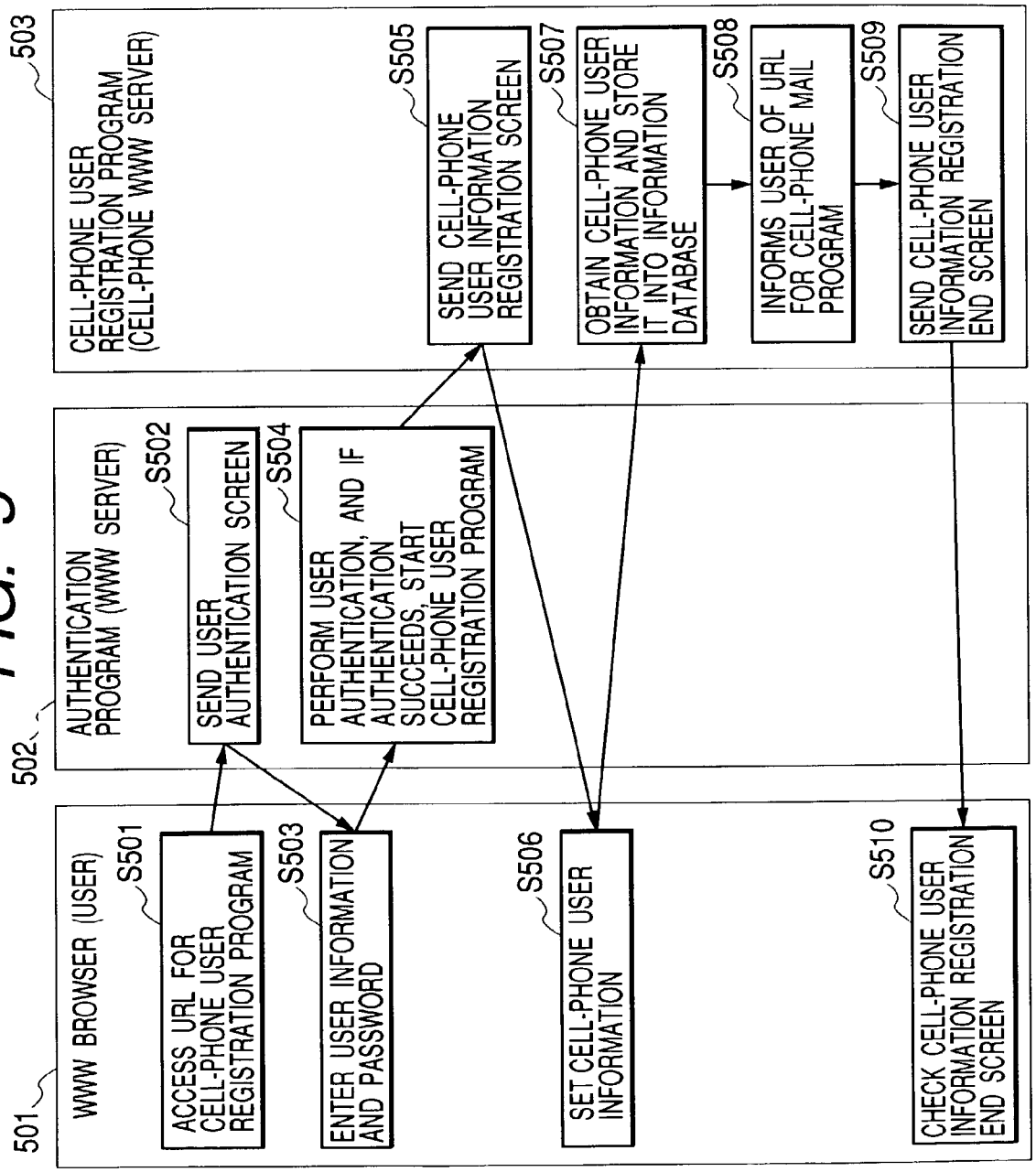
FIG. 5 is a diagram showing a flow of a cell-phone user registration process.

In FIG. 5, 501 is a WWW browser running on the PC 102 (client 2a) shown in FIG. 1, 502 is an authentication program running on the WWW server 106 shown in FIG. 1, and 503 is a cell-phone user registration program running on the cell-phone WWW server 109 shown in FIG. 1.

For a specific user (referred to as "User 2" hereinafter) to employ a cell-phone service, a cell-phone user registration process must be performed at first.

At step S401, User 2 accesses the WWW server 106 of the e-mail system by controlling a WWW browser running on the client 2a shown in FIG. 1. Then, at step S402, an authentication program 106a of a WWW server generates a user authentication screen and sends the screen to the WWW browser.

At step S403, User 2 views the authentication screen and enters a user ID and a password required for authentication. Then, at step S404, the authentication program performs authentication by referring to user information data within a user information database. If the authentication succeeds, the authentication program generates an authentication ID, stores the authentication ID in association with the user ID into an authentication database, and sets an authentication ID timer to the specific time period. Then the authentication program starts the user registration program.

At step S405, the user registration program generates a user information registration page and sends the page to the WWW browser.

At step S406, User 2 views the user registration page and then enters a setting of starting the employment of the cellular phone service. At step S407, the user registration program starts a cell-phone account generation program.

At step S408, the cell-phone account generation program generates a user account for User 2 in a cell-phone mail server. At this moment, User 2's e-mail address for cellular phone service is generated. At step S409, the cell-phone account generation program informs the user of a URL for cell-phone user registration program. More specifically, a piece of e-mail containing a URL for cell-phone user registration program is sent to the user's e-mail address for PC.

At S410, the cell-phone account generation program starts a charge program running on a charge server. At this, moment, the charge program stores a date and time of starting the cellular phone service into a charge DB.

The process continues to step S411, where the user registration program generates a cell-phone user registration end screen containing the account and sends the screen to a WWW browser of the PC.

At step S412, User 2 views and checks the user registration end screen.

User 2 then uses a WWW browser of the PC (client 2a) and views a piece of e-mail containing a URL for cell-phone user registration program which is received at the e-mail address for PC.

At step S501, User 2 accesses a WWW server of the e-mail system by controlling a WWW browser running on the client 2a shown in FIG. 1. At step S502, the authentication program 106a of the WWW server generates a user authentication screen and sends the screen to the WWW browser.

At step S503, User 2 views the authentication screen and then enters a user ID and a password required for authentication. Then, at step S504, the authentication program performs authentication by referring to user information data in a user information database. If the authentication succeeds, the authentication program generates an authentication ID, stores the authentication ID in association with the user ID into the authentication database, and sets an authentication ID timer to a specific time period. Then the authentication program starts the cell-phone user registration program.

Figure 6:
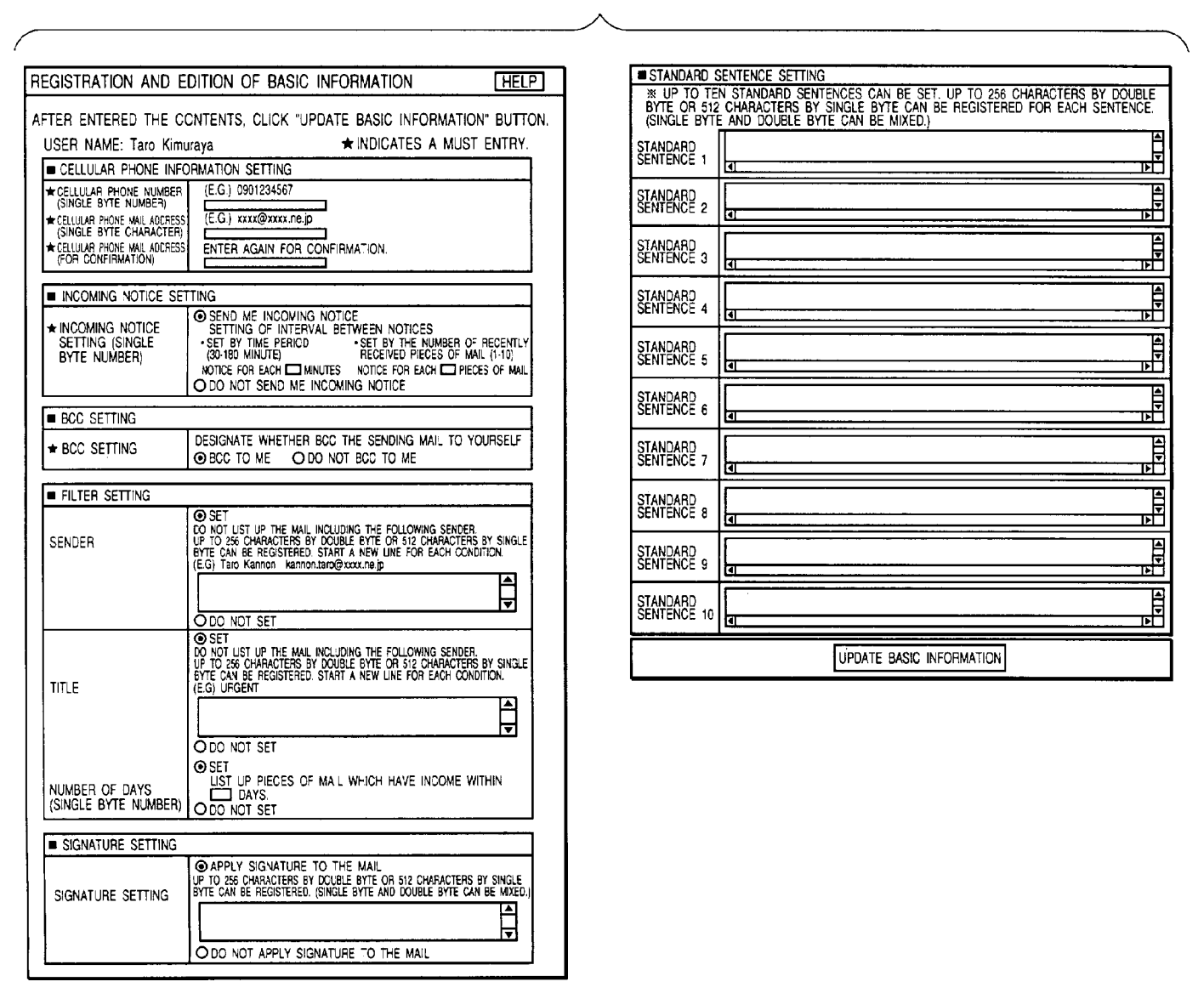

At step S505, the user registration program generates a cell-phone user information registration page as shown in FIG. 6 and sends the page to the WWW browser of the PC.

The cell-phone user information registration page is provided with such input areas for registering 13 entries of cell-phone user information as follows.

(1) Cellular phone number: An area for a user to enter the user's cellular phone number in single-byte number.
(2) Cell-phone mail address: An area for a user to enter a mail address given by a cellular phone company.
(3) Area for entering a cell-phone mail address for confirmation.
(4) Incoming notice setting: An area for a user to perform a setting about incoming notice. This area is composed of an area for setting whether an incoming notice should be sent to the mail address given by the cellular phone company which is set in (2) and an area for setting an interval between incoming notices by time period or by the number of recently received pieces of mail.
(5) Bcc setting: An area for a user to designate whether a sending mail should be automatically Bcc'ed to the user.
(6) Filter setting (sender): An area for a user to perform a setting about filtering based on a sender's name of a received mail. This area is composed of an area for setting whether senders should be filtered and an area for setting a character string (sender) for sender filtering.
(7) Filter setting (title of a piece of mail): An area for a user to perform a setting about filtering based on a title of a received mail. This area is composed of an area for setting whether title filtering should be done and an area for setting a character string for title filtering.
(8) Filter setting (the number of days): An area for a user to perform a setting about filtering by how old a received mail is by the number of days. This area is composed of an area for setting whether filtering by the number of days should be done and an area for setting a character string (the number of days) for filtering by the number of days.
(9) Signature setting: An area for a user to perform a setting about a signature. This area is composed of an area for setting whether a signature should be affixed to a sending mail and an area for setting a character string for the signature.
(10) Standard sentence setting: An area for a user to enter a standard sentence. Up to ten standard sentences can be set.
(11) "Update Basic Information" button: A button for updating information after a user has entered and set all required entries.

At step S506, User 2 views the cell-phone user information registration page, enters the above-mentioned respective pieces of cell-phone user information and then selects "Update Basic Information" button. When the designation of "Update Basic Information" button by the user is detected, the entered respective pieces of cell-phone user information are sent to the cell-phone user registration program.

At step S507, the cell-phone user registration program obtains the respective pieces of cell-phone user information and stores the information into a cell-phone user information storage area of a user information database.

FIG. 7 is a diagram representing details of a cell-phone user information storage area. As shown in FIG. 7, the cell-phone user information storage area is provided with 30 fields for storing respective pieces of cell-phone user information for each user.

Fields from 21 to 30 are areas for storing information of ten kinds of standard sentences. Each area for storing standard sentence information is composed of a standard sentence character string area for storing a standard sentence character string, a frequency area for storing a frequency of standard sentence usage, and a latest used date and time area for storing the latest used date and time for a standard sentence.

Then at step S508, the cell-phone user registration program informs the user of a URL for cell-phone mail program and a URL for cell-phone address book program. More specifically, the cell-phone user registration program sends a piece of e-mail containing a URL for cell-phone mail program and a URL for cell-phone address book program to the e-mail address given by a cellular phone company.

The URL for cell-phone mail program and a URL for cell-phone address book program include ID information for identifying the user. By clicking the URL contained in the e-mail, the user is enabled to employ e-mail for the user's cellular phone service as a cell-phone WWW browser of a cellular phone is automatically started, while the user is also enabled to view the piece of e-mail sent to the mail address for PC by using a cellular phone as the piece of e-mail sent to a mail address for PC is forwarded to the e-mail address for the cellular phone service.

Then at S509, the cell-phone user registration program generates a cell-phone user information registration end screen and sends the screen to the WWW browser. At step S510, User 2 views and checks the cell-phone user information registration end screen.

Description of E-mail Incoming Process

A flow of process where User 1 sends a piece of mail to an e-mail address for PC of User 2 and then the mail is saved in a mail storage area for User 2 in a mail spool of a cell-phone mail server will now be described.

First, User 1 controls the MUA program running on the client 1 (101) shown in FIG. 1, generates and sends a piece of e-mail to a destination of e-mail address for PC of User 2. Then the MTA program of the client 1 distributes the sent mail to a mail server 107 having a mail address of User 2 through SMTP (simple mail transfer protocol).

When the MTA program of the mail server 107 receives the piece of e-mail, it saves the mail in a mail storage area for User 2 in a mail spool and forwards the piece of e-mail to an e-mail address for cellular phone service of User 2, i.e. to the cell-phone mail server 108 shown in FIG. 1.

The cell-phone MTA program in the cell-phone mail server receives the forwarded e-mail and saves the piece of e-mail in a mail storage area for User 2 in a mail spool. Then the cell-phone MTA program calls an e-mail incoming process of a cell-phone mail program 109b running on a cell-phone WWW server 109 and finishes the process.

Figure 8:
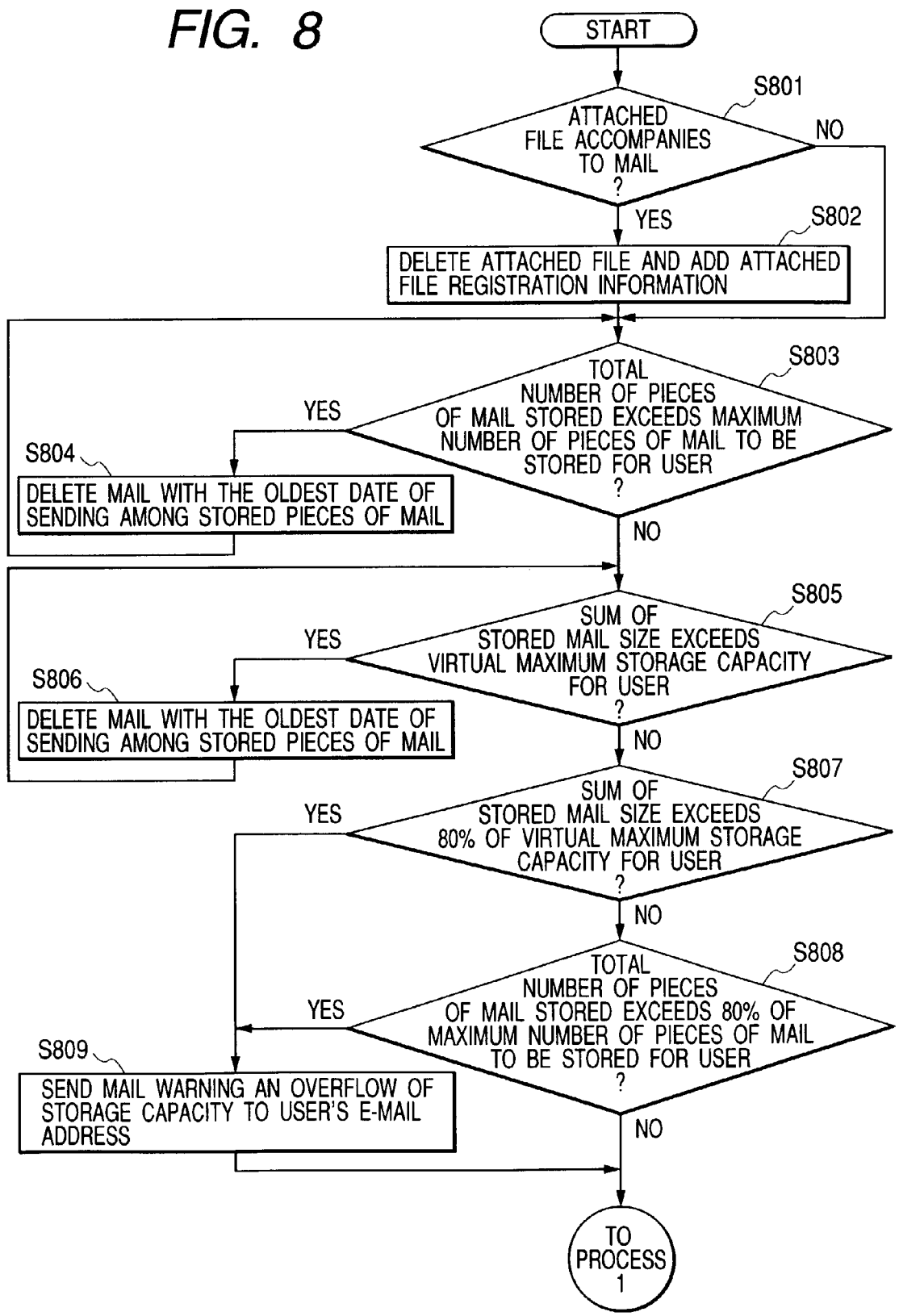
FIG. 8 is a flow chart of an e-mail incoming process.
Figure 9:
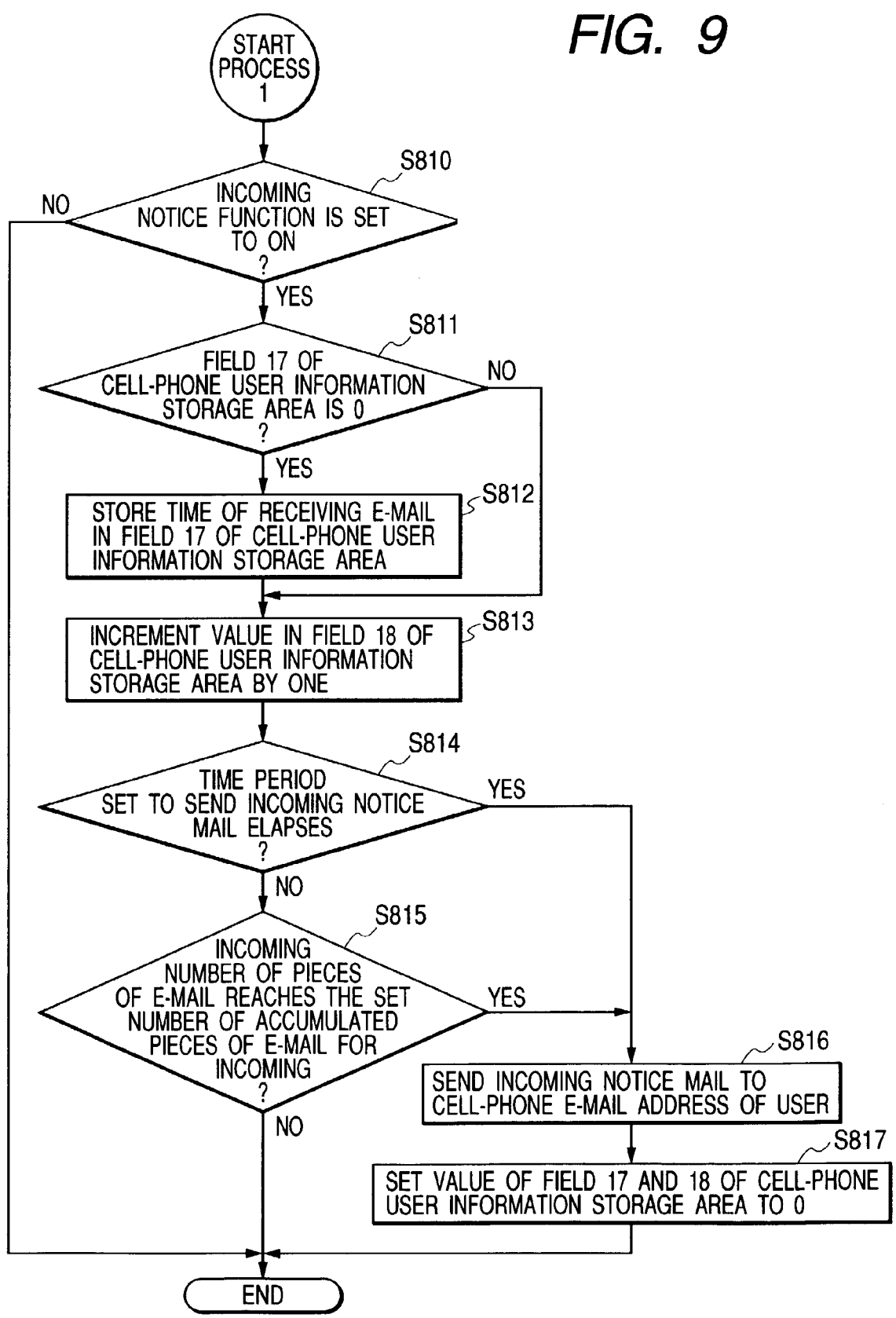
FIG. 9 is a flow chart of an e-mail incoming process.

A flow of an e-mail incoming process of a cell-phone mail program will now be described with reference to FIGS. 8 and 9.

When called by the cell-phone MTA program of the cell-phone mail server, at step S801, the e-mail incoming process checks to see if an attached file accompanies the piece of e-mail which have come and is saved. The attached file is considered to be an image, a text, a document file and the like. If the piece of e-mail is determined to be accompanied by an attached file, process proceeds to step S802 and deletes the attached file of the piece of e-mail which is stored. The process adds attached file delete information to indicate that the piece of e-mail was accompanied by an attached file into e-mail header information, and then overwrites mail data. The process continues to step S803.

If the piece of e-mail is determined not to be accompanied by an attached file at step S801, the process continues to step S803.

At step S803, the total number of pieces of mail stored in the mail storage area for User 2 in the mail spool of the cell-phone mail server 108 shown in FIG. 1 is checked to see if it exceeds the maximum number of pieces of mail to be stored for User 2. A system administrator can set the maximum number of pieces of mail to be stored at his/her own discretion.

If the maximum number of pieces of mail to be stored is exceeded, the process continues to step S804 and examines a date of a piece of mail sent contained in header information on each mail stored in a mail storage area for User 2 and detects the mail with the oldest date of sending among them. The process forwards the detected oldest mail to an e-mail address given by a cellular phone company of User 2 and then deletes the mail from a mail storage area. A mail server of a cellular phone company limits the number of characters which can be received and sent to around 200, so that the part of the forwarded mail after the 200th character from the beginning is automatically deleted. Then the process returns to step S803.

If the maximum number of pieces of mail to be stored is not exceeded at step S803, the process continues to step S805.

At step S805, a sum of mail size stored in the mail storage area for User 2 in the mail spool of the cell-phone mail server 108 shown in FIG. 1 is checked to see if it exceeds the virtual maximum storage capacity for User 2. A system administrator can set the virtual maximum storage capacity at his/her own discretion.

If the virtual maximum storage capacity is determined to be exceeded, the process continues to step S806 and examines a date of a piece of mail sent contained in header information on each mail stored in the mail storage area for User 2 and detects the mail with the oldest date of being sent among them. The process transfers the detected mail to an e-mail address given by a cellular phone company of User 2 and then deletes the mail from the mail storage area. The process returns to step S805.

If the virtual maximum storage capacity is determined not to be exceeded at step S805, the process continues to step S807.

At step S807, the total number of pieces of mail stored in the mail storage area for User 2 in the mail spool of the cell-phone mail server 108 shown in FIG. 1 is checked to see if it exceeds 80% of the maximum number of pieces of mail to be stored for User 2. If 80% of the maximum number of mail to be stored is determined to be exceeded, the process continues to step S809. Otherwise, the process continues to step S808.

At step S808, a sum of mail size stored in the mail storage area for User 2 in the mail spool of the cell-phone mail server 108 shown in FIG. 1 is checked to see if it exceeds 80% of the virtual maximum storage capacity for User 2. If 80% of the virtual maximum storage capacity is determined to be exceeded, the process continues to step S809. Otherwise, the process continues to step S810.

At step S809, a piece of mail warning an overflow of a mail storage capacity is sent to the user's e-mail address given by a cellular phone company. Then the process continues to step S810.

At step S810, an incoming notice function is checked to see if it is set to ON by referring to a value in field 11 of the cell-phone user information storage area shown in FIG. 7, which is stored in a user information database 110a of a database server 110 shown in FIG. 1. If it is determined to be set to OFF, the e-mail incoming function ends. If it is determined to be set to ON, the process continues to step S811.

At step S811, a value in field 17 of the cell-phone user information storage area is checked to see if it is 0. If a value in the field 17 is determined to be 0, the process continues to step S812, where it stores the time of receiving the piece of e-mail (i.e., incoming time of the piece of e-mail) in the field 17 of the cell-phone user information storage area. Then the process continues to step S813.

If a value in the field 17 is determined to be other than 0, the process continues to step S813.

At step S813, a value in field 18 of the cell-phone user information storage area is incremented by one. Then the process continues to step S814.

At step S814, a time period set for sending an incoming notice mail is checked to see if it elapses. More specifically, it is determined whether a value of the latest time of receiving the piece of e-mail (i.e., incoming time of the piece of e-mail) subtracted with a value in field 17 of the cell-phone user information storage area (time of deference) is greater than a value in field 9 of the cell-phone user information storage area. If a value calculated is determined to be greater than a value in field 19, the process determines that a time period set for sending an incoming notice mail elapses, and continues to step S816. If a value calculated is determined to be less than a value in field 19, the process determines that a time period set for sending an incoming notice mail does not elapse, and continues to step S815.

At step S815, it is checked to see if the incoming number of pieces of e-mail reaches the set number of pieces of mail to be accumulated to send an incoming notice mail. More specifically, it is determined whether a value in field 18 of the cell-phone user information storage area subtracted with a value in field 10 is greater than 0. If a value calculated is determined to be greater than 0, the process determines that the set number of pieces of mail to be accumulated is reached, and continues to step S816. If a value calculated is determined to be less than 0, the process determines that the set number of pieces of mail to be accumulated is not reached, and the e-mail incoming process ends.

At step S816, to inform the user of incoming of a piece of e-mail, a piece of e-mail containing a URL for cell-phone mail program running on the cell-phone WWW server 109 shown in FIG. 1 is sent to a cellular phone e-mail address of the user.

The URL for cell-phone mail program contains ID information for identifying the user.

Then the process continues to step S817, sets values in fields 17 and 18 of the cell-phone user information storage area to 0, and then the e-mail incoming process ends.

In the case that time of receiving a piece of mail is set in field 17 at step S812 and a value in field 18 is set to 1 or more at step S813 independently of a process of step S814, if a predetermined time period (a previously defined time period larger than a value in field 9) is determined to elapse without resetting a value in field 18 to 0, an incoming notice mail is sent and values in fields 17 and 18 will be reset to 0.

As described above, in the embodiment, a piece of e-mail received by the mail server 107 for PC is copied in the cell-phone mail serer 108. Accordingly, in order to view a piece of e-mail from a mobile terminal, the mail does not have to remain in a mail server for PC. Thus, a piece of e-mail can be viewed from a mobile terminal after the mail has obtained at a PC.

Description of E-mail Process

Processes when User 2 controls a cell-phone WWW browser of a cellular phone to manipulate a piece of e-mail will now be described by referring to FIGS. 10, 11, 12, 13, 14, 15, 16, 17.

Description of Logging in Process

First, User 2 uses an e-mail address sending and receiving function given by a cellular phone company and views a piece of e-mail sent by a cell-phone user registration program or a piece of e-mail sent through an e-mail incoming process of a cell-phone mail program. Each of the pieces of e-mail contains a URL for cell-phone mail program as mentioned above.

When a URL for cell-phone mail program contained in the piece of e-mail is selected by User 2, a cell-phone WWW browser of the cellular phone is started and an access to a URL for cell-phone mail program starts.

Figure 10:
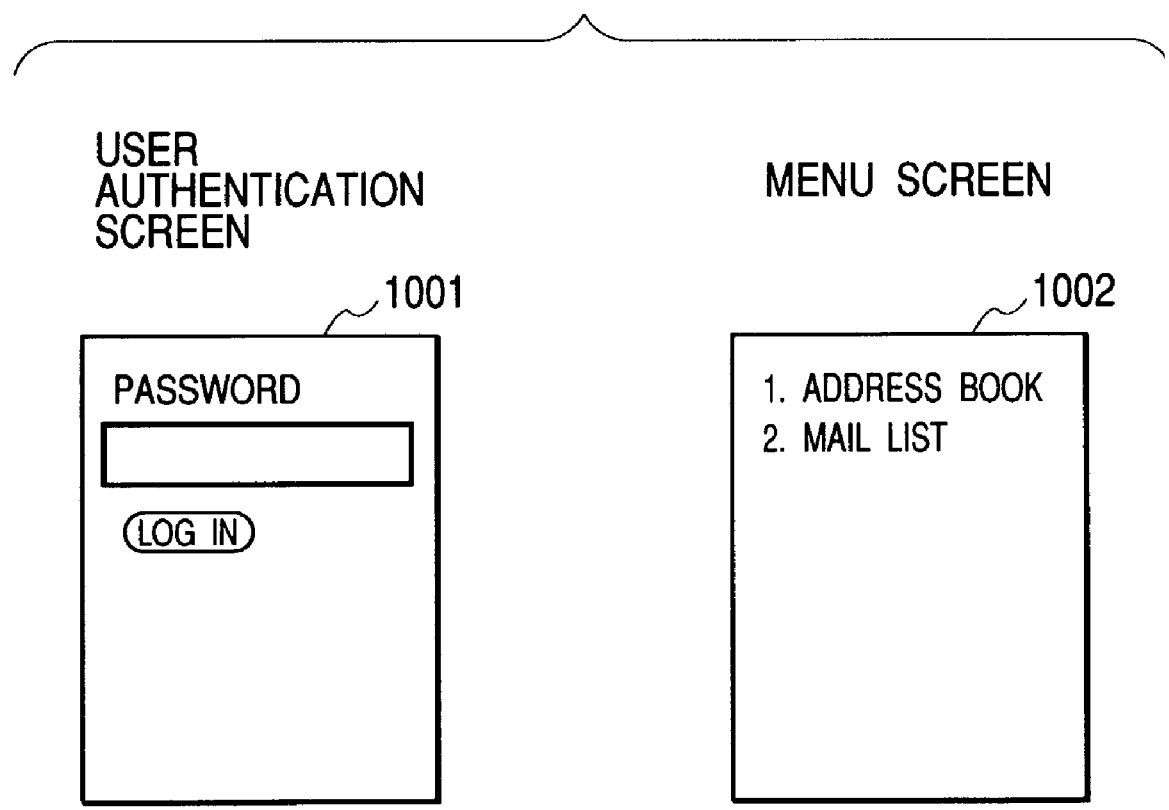
FIG. 10 is a display screen to be shown on a cellular phone.

When a URL for cell-phone mail program is accessed through the cell-phone WWW browser of the cellular phone, the authentication program 106*a* of the WWW server 106 shown in FIG. 1 is started, which generates a user authentication screen 1001 shown in FIG. 10 and sends the screen to the cell-phone WWW browser of the cellular phone.

When User 2 views the user authentication screen and enters a password required for authentication, the authentication program searches a user information database and refers to a user information data by using user identification ID information accompanying the URL for cell-phone mail program and entered password information to perform authentication.

If the authentication succeeds, the authentication program generates an authentication ID, stores the authentication ID in association with the user ID in an authentication database and sets a timer for the authentication ID to a specific time period. Next, the authentication program starts the cell-phone mail program 109*b* of the cell-phone WWW server 109 shown in FIG. 1 and passes the generated and stored authentication ID to the cell-phone mail program.

Figure 11:
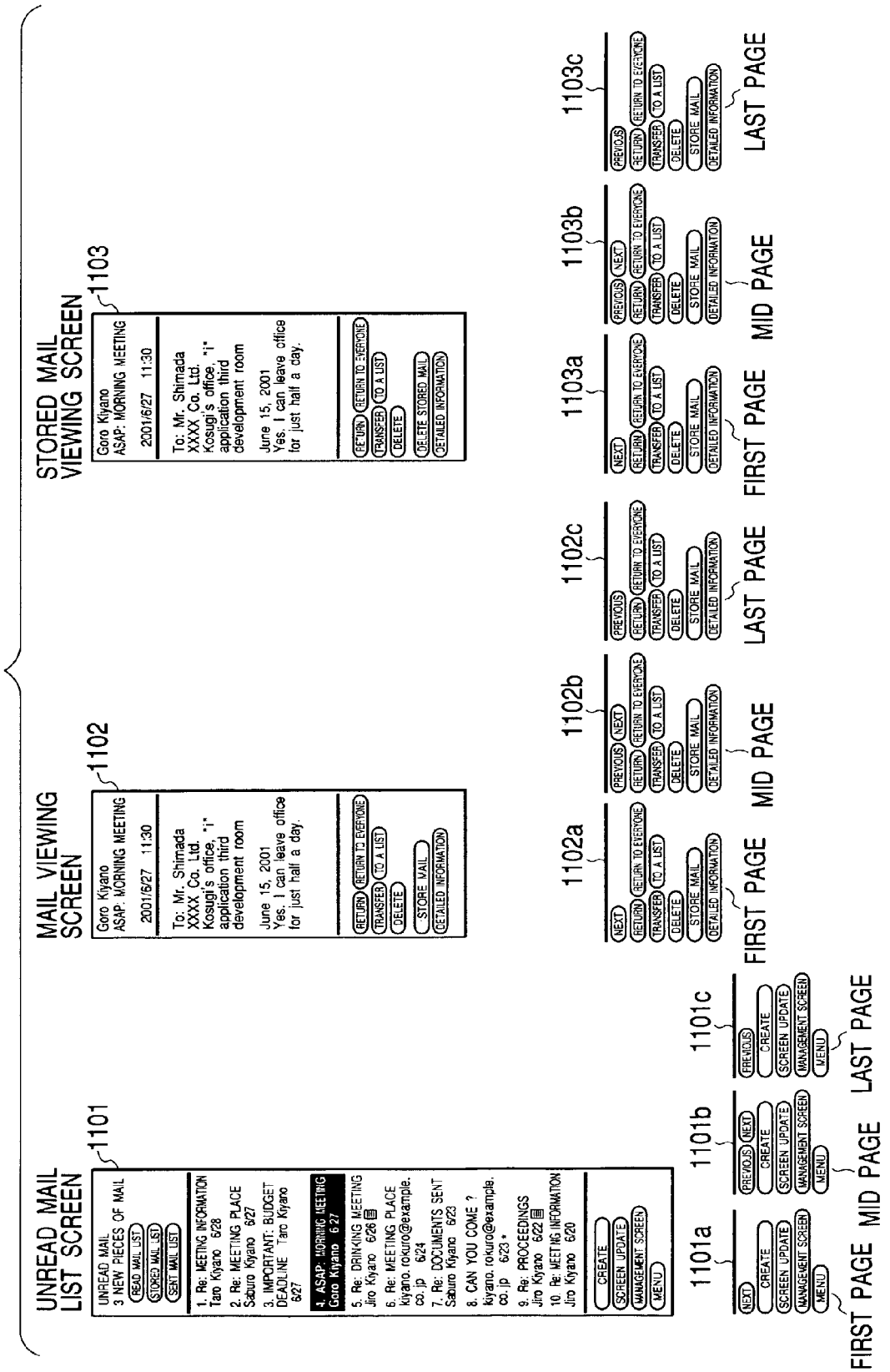
FIG. 11 is a display screen to be shown on a cellular phone.

Then the started cell-phone mail program refers to a piece of mail stored in a mail storage area for User 2 in a mail spool of the cell-phone mail server 108 shown in FIG. 1 to search for an unread mail and extract a title of the mail, generates an unread mail list screen 1101 shown in FIG. 11 and sends the screen to the cell-phone WWW browser of the cellular phone.

Description of Unread Mail List Viewing Process

When User 2 accesses with a URL for cell-phone mail program by controlling a cell-phone WWW browser of a cellular phone, or when User 2 selects "Unread Mail List" button on any of an read mail list screen 1202, a stored mail list screen 1203, or a sent mail list screen 1301, or when User 2 moves from an unread mail list to a mail viewing screen 1102 shown in FIG. 11 and then selects "For List" button, the cell-phone mail program refers to a piece of mail stored in a mail storage area for User 2 in a mail spool of a cell-phone mail server, and according to a filtering setting thereof, searches for an unread mail, extracts a title of the mail, generates the unread mail list screen 1101 shown in FIG. 11 and sends the screen to the cell-phone WWW browser of the cellular phone.

The unread mail list screen 1101 is composed of an "area for displaying the number of newly arrived pieces of mail" representing the total number of pieces of mail which have been sent after the last time the user accessed a URL for cell-phone mail program and viewed pieces of mail and logged out (i.e., after the session closed); "Read Mail List" button for moving to a read mail list screen 1202; "Stored Mail List" button for moving to a stored mail list screen 1203, "Sent Mail List" button for moving to a sent mail list screen 1301; an "area for displaying an unread mail list" for displaying titles of pieces of mail which the user has not viewed by ten; "Create" button for moving to a mail creating/sending screen 1303; "Screen Update" button for updating information in the unread mail list; "Management Screen" button for moving to a management screen 1701; and "Menu" button for moving to a menu screen 1002.

User 2 can check unread pieces of mail by viewing an "area for displaying unread mail list" on an unread mail list screen. Ten titles of unread pieces of mail are displayed for each page. If unread pieces of mail are more than ten, i.e., if the next page exists, a display area at the bottom of the unread mail list screen is changed by adding "Next" button as shown in 1101*a*. If a previous page and a next page exist, "Previous" button and "Next" button are displayed at the bottom of the screen as shown in 1101*b*. On the last page, "Previous" button is added at the bottom of the screen as shown in 1101*c*. That is to say, User 2 can view an unread mail list across multiple pages by controlling "Previous" button and "Next" button to change the displayed page on the unread mail list screen.

Description of Filtering Process in Generating an Unread Mail List

The cell-phone mail program searches and selects acceptable unread pieces of mail by checking a filtering condition and displays the pieces of mail on an "area for displaying an unread mail list" to generate an unread mail list screen.

First, the cell-phone mail program refers to field 15 within a cell-phone user information storage area of a user information database 110*a* shown in FIG. 1 and checks to see if a number of days filtering function is set to ON. If the number of days filtering function is determined to be set to ON, the cell-phone mail program refers to field 8 within the cell-phone user information storage area, obtains the date of the number of days filtering, searches and selects unread pieces of mail sent between the obtained date of the number of days filtering and the current date and time as candidates for listing, and stores the pieces of mail into a temporally area.

Next, the cell-phone mail program refers to field 14 within the cell-phone user information storage area of the user information database 110*a* shown in FIG. 1 and checks to see if a title filter function is set to ON. If title filter function is determined to be set to ON, the cell-phone mail program refers to field 7 within the cell-phone user information storage area, obtains a title filter character string, refers to titles contained in mail header information on unread pieces of mail, checks to see if a title filter character string is contained, and stores the unread pieces of mail which do not contain the title filter character string as candidates for listing in a temporally area. If the number of days filter function is set to ON in addition to title filter function, title filtering is performed on the unread pieces of mail stored in a temporally area as candidates for listing after being filtered by the number of days filter function. If a piece of mail whose mail header information contains title filter character string is found, the mail is removed from the candidates for listing.

Then, the cell-phone mail program refers to field 13 within the cell-phone user information storage area and checks to see if a sender filtering function is set to ON. If the sender filtering function is determined to be set to ON, the cell-phone mail program refers to field 6 within the cell-phone user information storage area, obtains a sender filtering character string, refers to senders contained in mail header information on unread pieces of mail, checks to see if the sender filtering character string is contained in the pieces of mail, and stores the unread pieces of mail which do not contain the sender filtering character string in a temporally area as candidates for listing. If at least one of a number of days filter function and title filter function is set to ON, the sender filtering is performed on the unread pieces of mail stored in a temporally area as candidates for listing after being filtered. If a piece of mail whose mail header information contains a sender filtering character string is found, the mail is removed from the candidates for listing.

Finally, the cell-phone mail program displays pieces of unread mail left in the candidates for listing in an "area for displaying an unread mail list" to generate an unread mail list screen.

Description of Unread Mail Viewing Process

When User 2 selects a specific mail from the unread mail list on the unread mail list screen 1101 shown in FIG. 11, the cell-phone mail program reads out data on the selected mail from a mail storage area for User 2, adds read information indicating that it is a read mail in mail header information on the mail, generates a mail viewing screen 1102 shown in FIG. 11 and sends the screen to the cell-phone WWW browser of the cellular phone. The mail selected and viewed becomes a read mail, so that the mail is no longer displayed in the unread mail list on the unread mail list screen 1101, while displayed in a read mail list on a read mail list screen 1202 shown in FIG. 12.

The mail viewing screen 1102 is composed of an "area for displaying sender of mail", an "area for displaying title of mail", an "area for displaying date and time of sending mail", an "area for displaying mail body" which displays 512 characters on each page, "Return" button for moving to a mail creating/sending screen with a mail sender contained in mail header information being set as a destination, "Return to Everyone" button for moving to a mail creating/sending screen with an address of a mail sender contained in a mail header and an address contained in "to" or "cc" field of the mail being set as destinations, "Forward" button for moving to a mail creating/sending screen with a mail body being set to a body as forward information, "To a List" button for moving to a mail list screen (i.e., a button for moving to an unread mail list screen when a user has moved from an unread mail list screen to a mail viewing screen, and a button for moving to a read mail list screen when a user has moved from a read mail list to a mail viewing screen), "Delete" button for deleting a piece of mail being viewed, "Store the Mail" button for setting the mail being viewed not to be automatically deleted, and "Detailed Information" button for moving to a detailed information on a mail screen.

User 2 can check a mail body by viewing an area for displaying a mail body. If a mail body consists of more than 512 characters, i.e., if the next page exists, a display area at the bottom of the mail viewing screen is changed by adding "Next" button as shown in 1102*a*. If a previous page and a next page exist, "Previous" button and "Next" button are displayed at the bottom of the screen as shown in 1102*b*. On the last page, "Previous" button is added at the bottom of the screen as shown in 1102*c*. That is to say, User 2 can view a mail body across multiple pages by controlling "Previous" button and "Next" button to change pages.

Description of Mail Storage Process

When User 2 selects "Store the Mail" button on a mail viewing screen, the cell-phone mail program adds storage designating information for indicating that it is a stored mail to mail header information for a piece of mail displayed on the viewing screen (a piece of mail added with the storage designating information is referred to as "a stored mail" hereinafter), generates a stored mail viewing screen 1103 as shown in FIG. 11 and sends the screen to the cell-phone WWW browser of the cellular phone.

The stored mail viewing screen 1103 is composed of an "area for displaying sender of mail", an "area for displaying title of mail", an "area for displaying date and time of sending mail", an "area for displaying mail body" which displays 512 characters on each page, "Return" button for moving to a mail creating/sending screen with a mail sender contained in mail header information being set as a destination, "Return to Everyone" button for moving to a mail creating/sending screen with an address of a mail sender contained-in a mail header and an address contained in "to" or "cc" fields of the mail being set as destinations, "Forward" button for moving to a mail creating/sending screen with a mail body being set to a body as forward information, "To a List" button for moving to a mail list screen, "Delete" button for deleting a piece of mail being viewed, "Reset Storage" button for deleting a storage designating information on a piece of mail being viewed, and "Detailed Information" button for moving to a detailed information on a mail screen.

Even if a stored mail exceeds a limit of a mail storage area for User 2 in a mail spool of a cell-phone mail server, the mail is not deleted in the e-mail incoming process of the cell-phone mail program (S804, S806).

A piece of mail which is directed to be stored is no longer displayed in a read mail list on a read mail list screen 1202 shown in FIG. 12, while displayed in a stored mail list on a stored mail list screen 1203 shown in FIG. 12.

Description of Reset Storage of Mail Process

When User 2 selects "Reset Storage" button on a stored mail viewing screen, the cell-phone mail program deletes storage designating information from mail header information on a piece of mail being displayed on a viewing screen, generates a mail viewing screen 1102, and sends the screen to the cell-phone WWW browser of the cellular phone.

Description of Mail Details Screen Viewing Process

When User 2 selects Detailed Information button on a mail viewing screen or a stored mail viewing screen, the cell-phone mail program analyzes information contained in mail header information on the mail being viewed, generates a mail details screen 1201 shown in FIG. 12, and sends the screen to the cell-phone WWW browser of the cellular phone.

The screen of detailed information on a piece of mail 1201 is composed of an "area for displaying sender of mail", an "area for displaying destination of mail", an "area for displaying CC destination of mail", an "area for displaying date and time of sending mail", an "area for displaying title of mail", an "area for displaying existence of attached file" and an "area for displaying information on stored mail". User 2 can view details of mail header information by viewing the screen of detailed information on a piece of mail.

Description of Read Mail List Viewing Process

When User 2 selects "Read Mail List" button on one of an unread mail list screen, a stored mail list screen, and a sent mail list screen, or when User 2 moves from a read mail list to a mail viewing screen and then selects "To a List" button, the cell-phone mail program searches for a read mail and extracts a title of the mail by referring to read information in mail header information on a piece of mail stored in a mail storage area for User 2 in a mail spool of a cell-phone mail server, generates a read mail list screen 1202 shown in FIG. 12 and sends the screen to the cell-phone WWW browser of the cellular phone.

The read mail list screen 1202 is composed of an "area for displaying the number of newly arrived pieces of mail" for displaying the total number of pieces of mail sent after the last time the user viewed pieces of mail and logged out, "Unread Mail List" button for moving to an unread mail list screen, "Stored Mail List" button for moving to a stored mail list screen, "Sent Mail List" button for moving to a sent mail list screen, an, "area for displaying a read mail list" for displaying ten titles of read pieces of mail for each page, "Create" button for moving to a mail creating/sending screen, "Screen Update" button for updating information in an read mail list, "Management Screen" button for moving to a management screen, and "Menu" button for moving to a menu screen.

User 2 can check the read mail by viewing an "area for displaying a read mail list" on a read mail list screen. Ten read pieces of mail are displayed on each page. If read pieces of mail are more than ten, i.e., if the next page exists, a display area at the bottom part of the screen is changed by adding "Next" button as shown in the screen of 1202a. If a previous page and a next page exist, "Previous" button and "Next" button are displayed at the bottom of the screen as shown in the screen of 1202b. On the last page, "Previous" button is added at the bottom of the screen as shown in the screen of 1202c. That is to say, User 2 can view a read mail list across multiple pages by controlling "Previous" button and "Next" button to change the displayed page on the read mail list.

Description of Read Mail Viewing Process

When User 2 selects a specific mail from a read mail list on a read mail list screen 1202, the cell-phone mail program reads out data on the selected mail from a mail storage area for User 2, generates a mail viewing screen 1102 as shown in FIG. 11 and sends the screen to the cell-phone WWW browser of the cellular phone.

User 2 can check the contents of a read mail by viewing the mail viewing screen.

Description of Stored Mail List Viewing Process

When User 2 selects "Stored Mail List" button on one of an unread mail list screen, a read mail list screen, and a sent mail list screen, or when User 2 moves from a stored mail list to a stored mail viewing screen and then selects "To a List" button, the cell-phone mail program searches for a stored mail and extracts a title of the mail by referring to read information in mail header information on a piece of mail stored in a mail storage area for User 2 in a mail spool of a cell-phone mail server, generates a stored mail list screen 1203 as shown in FIG. 12 and sends the screen to the cell-phone WWW browser of the cellular phone.

The stored mail list screen 1203 is composed of an "area for displaying the number of newly arrived pieces of mail" for displaying the total number of pieces of mail sent after the last time the user viewed pieces of mail and logged out, "Unread Mail List" button for moving to an unread mail list screen, "Read Mail List" button for moving to a read mail list screen, "Sent Mail List" button for moving to a sent mail list screen, an "area for displaying a stored mail list" for displaying ten titles of stored pieces of mail, "Create" button for moving to a mail creating/sending screen, "Screen Update" button for updating information in a stored mail list, "Management Screen" button for moving to a management screen, and "Menu" button for moving to a menu screen.

User 2 can check the stored mail by viewing an "area for displaying a stored mail list" on a stored mail list screen. Ten titles of stored pieces of mail are displayed on each page. If stored pieces of mail are more than ten, i.e., if the next page exists, a display area at the bottom of the screen is changed by adding "Next" button as shown in the screen of 1203a. If a previous page and a next page exist, "Previous" button and "Next" button are displayed at the bottom of a screen as shown in the screen of 1203b. On the last page, "Previous" button is added at the bottom of a screen as shown in the screen of 1203c. That is to say, User 2 can view a stored mail list across multiple pages by controlling "Previous" button and "Next" button to change the displayed page on the stored mail list.

Description of Stored Mail Viewing Process

When User 2 selects a specific mail from a stored mail list on a stored mail list screen 1203, the cell-phone mail program reads out data on the selected mail from a mail storage area for User 2, generates a stored mail viewing screen 1103 as shown in FIG. 11 and sends the screen to the WWW browser of the cellular phone.

User 2 can check the contents of a stored mail by viewing a stored mail viewing screen.

Description of Sent Mail List Viewing Process

When "Sent Mail List" button is selected on one of an unread-mail list screen, a read mail list screen, and a stored mail list screen, when "To a List" button is selected on a sent mail viewing screen 1302, or when "To a List" button is selected on a mail creating/sending screen 1303, the cell-phone mail program searches for a sent mail stored in a mail storage area for User 2 in a mail spool of a cell-phone mail server, extracts a title of the mail, generates a sent mail list screen 1301 as shown in FIG. 13 and sends the screen to the cell-phone WWW browser of the cellular phone.

The sent mail list screen 1301 is composed of an "area for displaying the number of newly arrived pieces of mail" for displaying the total number of pieces of mail sent after the last time the user viewed pieces of mail and logged out, "Unread Mail List" button for moving to an unread mail list screen, "Read Mail List" button for moving to a read mail list screen, "Stored Mail List" button for moving to a stored mail list screen, an "area for displaying a sent mail list" for displaying ten titles of sent pieces of mail for each page, "Create" button for moving to a mail creating/sending screen, "Screen Update" button for updating information in a sent mail list, "Management Screen" button for moving to a management screen, and "Menu" button for moving to a menu screen.

User 2 can check sent pieces of mail by viewing a sent mail list on a sent mail list screen. Ten titles of sent pieces of mail are displayed for each page. If sent pieces of mail are more than ten, i.e., if the next page exists, a displayed area at the bottom of the screen is changed by adding "Next" button as shown in the screen of 1301a. If a previous page and a next page exist, "Previous" button and "Next" button are displayed at the bottom of the screen as shown in the screen of 1301b. On the last page, "Previous" button is added at the bottom of a screen as shown in the screen of 1301c. That is to say, User 2 can view a sent mail list across multiple pages by controlling "Previous" button and "Next" button to change the displayed page on the sent mail list screen.

Description of Sent Mail Viewing Process

When User 2 selects a specific mail from a sent mail list on a sent mail list screen 1301, the cell-phone mail program reads out data on the selected mail from a mail storage area for User 2, generates a sent mail viewing screen 1302 as shown in FIG. 13 and sends the screen to the cell-phone WWW browser of the cellular phone.

The sent mail viewing screen 1302 is composed of an "area for displaying TO destination of mail", an "area for displaying CC destination of mail", an "area for displaying the titles of pieces of mail", an "area for displaying mail body" for displaying up to 512 characters for each page, "Forward" button for moving to a mail creating/sending screen with a mail body being set to a body as forward information, "To a List" button for moving to a sent mail list screen, and "Delete" button for deleting a piece of mail being viewed.

User 2 can check the contents of a sent mail by viewing the sent mail viewing screen.

Description of Mail Creating/Sending Process

When User 2 selects "Create" button on one of an unread mail list screen, a read mail list screen, a stored mail list screen, and a sent mail list screen, the cell-phone mail program generates a mail creating/sending screen 1303 as shown in FIG. 13 and sends the screen to the cell-phone WWW browser of the cellular phone.

When User 2 selects "Return" button on one of a mail viewing screen and a stored mail viewing screen, the cell-phone mail program generates a mail creating/sending screen with a mail sender contained in mail header information being set as a destination and sends the screen to the cell-phone WWW browser of the cellular phone.

When User 2 selects "Return to Everyone" button on one of a mail viewing screen and a stored mail viewing screen, the cell-phone mail program generates a mail creating/sending screen with an address of a mail sender contained in a mail header and other addresses contained in TO and CC fields as destinations, and sends the screen to the cell-phone WWW browser of the cellular phone.

When User 2 selects "Forward" button on one of a mail viewing screen and a stored mail viewing screen, the cell-phone mail program generates a mail creating/sending screen with a mail body being viewed being set to a body as forward information and sends the screen to the cell-phone WWW browser of the cellular phone.

The cell-phone mail program refers to field 16 within a cell-phone user information storage area in user information database 110a shown in FIG. 1, updates "Signature" check box according to whether a signature function is set or not and generates a mail creating/sending screen. More specifically, if a signature function is set to ON in field 16, the mail creating/sending screen is generated with "Signature" check box having a check mark.

The cell-phone mail program refers to field 12 within a cell-phone user information storage area, updates "BCC to me" check box according to whether a BCC function is set or not and generates a mail creating/sending screen. More specifically, if a BCC function is set to ON, the mail creating/sending screen is generated with a "BCC to me" check box having a check mark.

The mail creating/sending screen 1303 is composed of "TO" button for editing destinations of a piece of mail, an "area for displaying TO destinations" which have been set, "CC" button for editing CC destinations of a piece of mail, an "area for displaying CC destinations" which have been set, "Title" button for editing titles of pieces of mail, an "area for displaying titles of pieces of mail" which have been set, "Body" button for editing a mail body, an "area for displaying a leading character string of a body" which have been set, "Signature" check box for selecting whether a signature should be affixed to the mail or not, "BCC to me" check box for selecting whether a piece of mail should be BCC to the e-mail address for PC of User 2 or not, "Send" button for sending a piece of mail, "Save draft" button for storing an unfinished mail, "Read draft" button for reading out an unfinished mail which has been stored, and "To a List" button for moving to a sent mail list screen.

User 2 can create and send a piece of mail by manipulating a mail creating/sending screen.

Detailed Description of "Return" Process and "Return to Everyone" Process

The mail viewing screen 1102 and the stored mail viewing screen 1103 have "Return" button and "Return to Everyone" button for creating a return mail for a piece of mail being viewed. "Return" button is a button for creating a return mail for a sender of a piece of mail being viewed. "Return to Everyone" button is a button for creating a return mail both for a sender of a piece of mail being viewed and to every address but the receiver's mail address of addresses designated in TO and CC fields.

In the embodiment, e-mail is employed by using a mobile information terminal such as a cellular phone, whose display screen is very small and the capacity of the inner memory is also small. For such a mobile information terminal with a limited display area, if an unlimited size of contents is allowed to be displayed, operability for a user is degraded in such a way as it takes time to display the contents required by a user. However, restriction on a mail body size leads to problems such as all of a piece of e-mail body which should be read cannot be displayed. The embodiment limits the number of destination addresses which can be sent to at a time, for example up to 20. Such limitation of the number of destination addresses improves viewability and operability for a user in checking addresses which was set by the user. It also reduces the number of destinations of a piece of mail to be sent to at a time, so that the amount of a memory capacity needed at a time in a server can be reduced. Therefore, such limitation will lead an increased number of users to get a service at the server.

When "Return" button is pressed, the cell-phone mail program performs the following processes.

(1) Obtain an address of Reply-To field of a piece of mail being viewed. If Reply-To field does not exist in a piece of mail being viewed, obtain an address from From field.

(2) Obtain a title of a piece of mail being viewed.

(3) Create a mail creating/sending screen with the addresses obtained at (1) inserted into TO field and a title of a piece of mail obtained at (2) inserted into title field, send the screen data to a cell-phone WWW browser of a cellular phone and have the screen displayed there. 1304 in FIG. 13 is a mail creating/sending screen (a screen at returning a piece of mail) to be displayed on a cellular phone. The address obtained at (1) is input beforehand and displayed at TO field and the title obtained at (2) is input beforehand and displayed at TO field.

Process in the case that "Return to Everyone" button is pressed will now be described.

(1) Obtain an address of Reply-To field of a piece of mail being viewed. If Reply-To field does not exist in a piece of mail being viewed, obtain an address from From field.

(2) Obtain all addresses in TO field of a piece of mail being viewed and create an address list 1. Search the address list 1 for the address obtained at (1). If the address exists, delete the address from the address list 1.

(3) Obtain all addresses in CC field of a piece of mail being viewed and create an address list 2. Search the address list 2 for the address obtained at (1). If the address exists, delete the address from the address list 2.

(4) Obtain data on a title field of a piece of mail being viewed.

(5) Create data on a mail creating/sending screen, insert the address obtained at (1) into TO field, and insert the addresses listed up in the address lists 1 and 2 into a CC field.

(6) Insert the title data obtained at (3) into a title field.

(7) Display the created data on the mail creating/sending screen with the cell-phone WWW browser of the cellular phone. The mail creating/sending screen (a screen at returning a piece of mail to everyone) displayed on a cellular phone is designated by 1305 in FIG. 13. In the mail creating/sending screen 1305, an address obtained at (1) is displayed at TO field and one of the addresses inserted at (5) (i.e., the address listed up at the top of the address list 1) is displayed at CC field.

As mentioned above, ways for setting an address to be inserted in TO field and in CC field in a returning mail are different for "Return" button and "Return to Everyone" button.

The above-mentioned "Return to Everyone" process will now be described in detail with reference to FIG. 20.

In the case that too much mail addresses are set in a TO field and a CC field of a piece of mail being viewed, when "Return to Everyone" button is pressed, CC field may have an enormous number of addresses to be inserted. In such a case, the addresses will be displayed across multiple pages on a screen of a mobile information device, which degrades the operability. In addition to being temporally recorded on a hard disk of a server, such information on addresses to be sent is also stored as a part of a mail to be sent which is stored on the hard disk. As the number of users who use a mobile information device which is provided with a cell-phone mail service of the embodiment increases, a size of a storage area used to store addresses to be sent to increases too. For this reason, the embodiment reduces a size of a storage area to be used by limiting the maximum number of destination addresses which can be sent at a time to 20.

Figure 20:
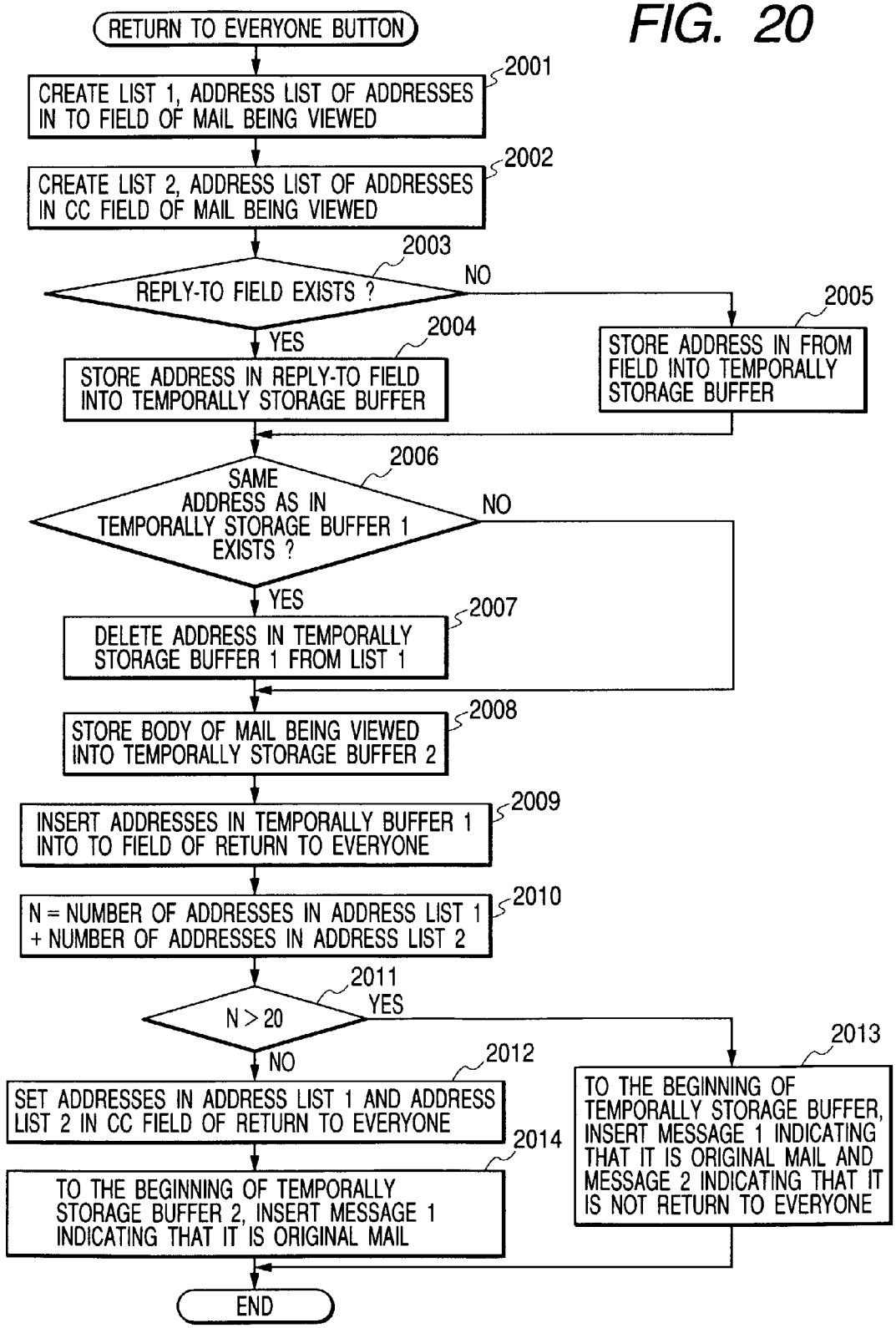
FIG. 20 is a flow chart showing a mail creation process for returning to everyone.

FIG. 20 illustrates the process from a point that "Return to Everyone" button is pressed to a point that a mail creating/sending screen 1305 with an address and a title being inserted is generated.

When "Return to Everyone" button is pressed, a list 1 for addresses contained in To field of a piece of mail being viewed (an original mail) is created at step 2001. Then, a list 2 for addresses contained in CC field of a piece of mail being viewed is created at step 2002. Whether Reply-To field is contained in a piece of mail being viewed is checked at step 2003. If Reply-To field exists, the process continues to step 2004 and stores addresses in the Reply-To into a temporally storage buffer 1. If Reply-To field does not exist, the process continues to step 2005 and stores addresses in From field of a piece of mail being viewed into a temporally storage buffer 1.

To prevent two copies of a return mail from being sent by accident, it is determined that lists 1 and 2 include the same address as one in the temporally storage buffer 1 at step 2006. If the same address is included, the same address as one in the temporally storage buffer 1 is deleted from the list 1 (or list 2) at step 2007.

A body of a piece of mail being viewed (an original mail) is stored in a temporally storage buffer 2 at step 2008.

An address in the temporally storage buffer 1 is set in TO field on a "return mail to everyone" creating/sending screen at step 2009. This will be a returning address. Then, the total number N of addresses included in address lists 1 and 2 is calculated at step 2010. The total number N is checked whether it exceeds the upper limit of the number of pieces of mail of 20 at step 2011. If it does not exceed the upper limit, addresses in address lists 1 and 2 are set in CC field on a "return mail to everyone" creating/sending screen at step 2012, and an original mail body stored in a temporally storage buffer 2 is inserted into a mail body field on a "return mail to everyone" creating/sending screen as a quote at step 2014.

If a value of the total number N exceeds 20 (the number of addresses to be set in CC field exceeds 20), the addresses are not set in the CC field, and at step 2013, a message indicating that the mail was not returned to everyone is inserted into the mail body field on a "return mail to everyone" creating/sending screen and an original mail body stored in a temporally storage buffer 2 is also inserted into the field as a quote.

Although an original mail body is described to be inserted into a "return mail to everyone" creating screen as a quote in the illustration of FIG. 20, the process can be arranged not to insert a quote in consideration of performance and communications costs for a cellular phone.

Description of TO destination Editing Process in Creating Mail

When User 2 selects "TO" button on a mail creating/sending screen 1303, the cell-phone mail program generates a TO destination address editing screen 1401 shown in FIG. 14 and sends the screen to a cell-phone WWW browser of a cellular phone.

Figure 15:
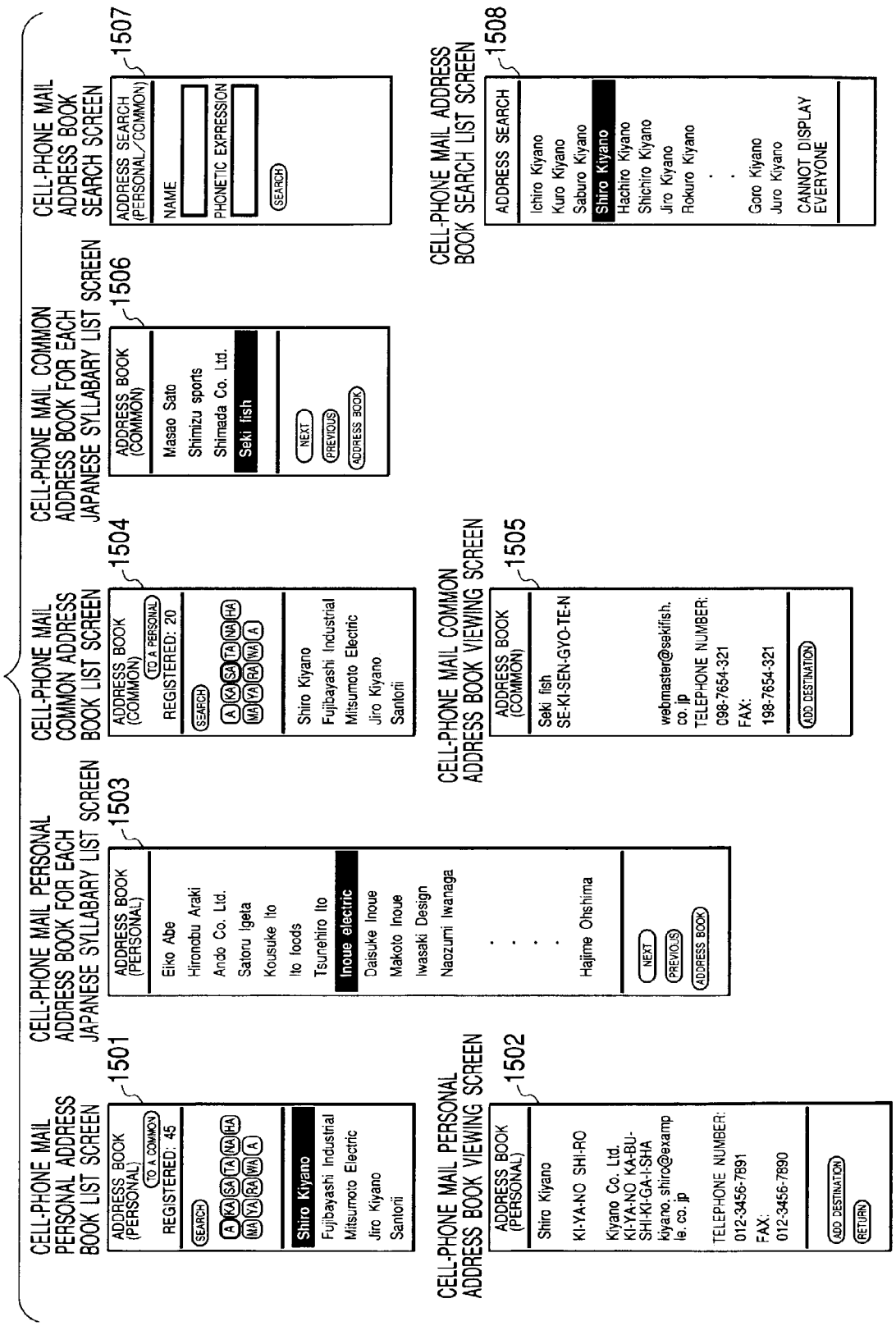
FIG. 15 is a display screen to be shown on a cellular phone.

The TO destination address editing screen 1401 is composed of an "area for displaying a set destination list", "Add Destination" button for moving to a cell-phone mail address manual editing screen 1403, "Address Book Reference" button for moving to a cell-phone mail personal address book list screen 1501 shown in FIG. 15, and "Send Screen" button for moving to a mail creating/sending screen 1303.

User 2 can add and edit TO destination addresses by manipulating the TO destination address editing screen 1401.

Description of CC Destination Editing Process in Creating Mail

When User 2 selects "CC" button on a mail creating/sending screen 1303, the cell-phone mail program generates a CC destination address editing screen 1402 shown in FIG. 14 and sends the screen to the cell-phone WWW browser of the cellular phone.

The CC destination address editing screen 1402 is composed of a set destination list, "Add Destination" button for moving to a cell-phone mail address manual editing screen 1403, "Address Book Reference" button for moving to a cell-phone mail personal address book list screen 1501, and "Send Screen" button for moving to a mail creating/sending screen.

User 2 can add and edit TO destination addresses by manipulating the CC destination address editing screen.

Description of Cell-phone Mail Address Manual Editing Process

When a user selects a blank line at the end of set destination list or "Add Destination" button on a TO destination address editing screen (or a CC destination address book editing screen), the cell-phone mail program generates a cell-phone mail address manual editing screen 1403 shown in FIG. 14 and sends the screen to a cell-phone WWW browser of a cellular phone.

The cell-phone mail address manual editing screen 1403 is composed of "Name" text box for entering a destination name, "Address" text box for entering a destination mail address, two radio buttons which can be exclusively set for designating whether the entered name and address should be added to just "destination" or to "destination/address book", "Add" button for adding the entered name and address, "Return" button for suspending a work and returning to a TO destination address editing screen (or a CC destination address editing screen).

When User 2 selects "Return" button, the cell-phone mail program suspends the process and generates a previous screen (a TO destination address editing screen or a CC destination address editing screen) and sends the screen to the WWW browser of the cellular phone.

When User 2 enters a destination name in "Name" text box, enters a destination mail address in "Address" text box, selects "Destination" radio button, and selects "Add" button, the cell-phone mail program sets the set destination name and mail address to a destination, stores the data in a temporally area and adds the data to a list on a TO destination address editing screen (or a CC destination address editing screen), and then generates a TO destination address editing screen (or a CC destination address editing screen) and sends the screen to the cell-phone WWW browser of the cellular phone.

When User 2 enters a destination name in "Name" text box, enters a destination mail address in "Address" text box, selects "Destination/Address Book" radio button and selects "Add" button, the cell-phone mail program generates an address book adding screen of a cell-phone mail address 1404 shown in FIG. 14 and sends the screen to the cell-phone WWW browser of the cellular phone.

Address book Adding Screen of Cell-phone Mail Address

The address book adding screen of a cell-phone mail address 1404 is a screen for adding address information on a specific person to an address book. This screen is composed of "Name" text box for entering a specific person's name, "Phonetic Expression" text box for entering a phonetic expression for a specific person's name, "Mail Address" text box for entering a mail address for a specific person, "Personal Address Book" check box for adding entered information to a personal address book, "Common Address Book" check box for adding entered information to a common address book, "Add" button for directing to add the entered information to the address book, and "Stop" button to stop a work.

When User 2 enters a specific person's name in "Name" text box, a phonetic expression for a specific person's name in "Phonetic expression" text box, a specific person's mail address in "Mail Address" text box, selects "Personal Address Book" check box and selects "Add" button, the cell-phone mail program stores the entered information in a personal address book information storage area for User 2 in an address book database 110*b*. Next, the cell-phone mail program sets the entered destination name and mail address to a destination, stores them in a temporally area, adds them to a list on a TO destination address editing screen (or a CC destination address editing screen). The cell-phone mail program then generates a TO destination address editing screen (or a CC destination address editing screen) and sends the screen to the cell-phone WWW browser of the cellular phone.

When User 2 enters a specific person's name in "Name" text box, a phonetic expression for a specific person's name in "Phonetic Expression" text box, a specific person's mail address in "Mail Address" text box, selects "Common Address Book" check box and selects "Add" button, the cell-phone mail program stores the entered information in a common address book information storage area in an address book database 110*b*. Next, the cell-phone mail program sets the entered destination name and mail address to a destination, stores them in a temporally area, adds them to a list on a TO destination address editing screen (or a CC destination address editing screen). The cell-phone mail program then generates a TO destination address editing screen (or a CC destination address editing screen) and sends the screen to the cell-phone WWW browser of the cellular phone.

When User 2 selects "Stop" button, the cell-phone mail program stops the process, generates a cell-phone mail address manual editing screen 1403, and sends the screen to the cell-phone WWW browser of the cellular phone.

Description of Cell-phone Mail Personal Address Book Reference Process

When User 2 selects "Address Book Reference" button on a TO destination address editing screen (or a CC destination address editing screen), the cell-phone mail program calls a cell-phone address book program 109*c*.

Next, the cell-phone address book program refers to address data stored in a personal address book data storage area for User 2 in an address book database 110*b*, then generates a cell-phone mail personal address book list screen 1501 shown in FIG. 15 and sends the screen to the cell-phone WWW browser of the cellular phone.

The cell-phone mail personal address book list screen 1501 is composed of "To Common" button for moving to a cell-phone mail common address book list screen 1504, an "area for displaying the number of registered addresses" of a personal address book, "Search" button for moving to a search screen to search for data on a personal address book, respective buttons for moving to a cell-phone mail personal address book list for each Japanese syllabary 1503 by searching a personal address book for each Japanese syllabary (Japanese "A" button, "KA" button, "SA" button, "TA" button, "NA"

button, "HA" button, "MA" button, "YA" button, "RA" button and "WA" button for searching by each column of a table for Japanese syllabary, and an alphabet "A" button), and an "area for displaying a list of the last five addresses" for displaying a list of five names of address information which have recently been referred to by User 2.

User 2 can search and refer to an address book and then add a specific person's name and e-mail address registered in a personal address book to a TO destination (or a CC destination) of a piece of mail by manipulating the cell-phone personal address book list screen.

When User 2 selects one of Japanese "A" button, "KA" button, "SA" button, "TA" button, "NA" button, "HA" button, "MA" button, "YA" button, "RA" button, "WA" button, and an alphabet "A" button on the cell-phone mail personal address book list screen 1501, the cell-phone address book program sorts and searches data on the personal address book for each column of a table for Japanese syllabary (an alphabet "A" button is for a name beginning with an alphabet), generates a list of a cell-phone mail personal address book for the column of a table for Japanese syllabary designated with a button and sends the list to the cell-phone WWW browser of the cellular phone.

The list of a cell-phone mail personal address book for Japanese syllabary screen 1503 is composed of an address list where names are sorted for each column of a table for Japanese syllabary and displayed by 20 names for each page (for example, when User 2 selects Japanese "A" button, address data on names which begin with a column of "A" is sorted and displayed), "Next" button for moving to the next page, "Address Book" button for moving to a cell-phone mail personal address book list screen.

User 2 can check a specific person's address by viewing and manipulating the address list for each column of a table for Japanese syllabary.

When User 2 selects one of names displayed in an "area for displaying a list of the last five addresses" on a cell-phone mail personal address book list screen, or when User 2 selects one of names displayed in an "area for displaying an address list for each column" on a cell-phone mail personal address book for Japanese syllabary list screen, or when User 2 selects one of names displayed in an "area for displaying a list of search addresses" on a cell-phone mail address book search list screen displayed as a result of searching a personal address book, the cell-phone address book program generates a cell-phone mail personal address book viewing screen 1502 and sends the screen to the cell-phone WWW browser of the cellular phone.

The cell-phone mail personal address book viewing screen 1502 is a screen for displaying details of specific person's address information. The screen is composed of an "area for displaying name" of a specific person, an "area for displaying a phonetic expression" of a specific person's name, an "area for displaying a name of a company" to which a specific person belongs, an "area for displaying an e-mail address" of a specific person, an "area for displaying a telephone number" of a specific person, an "area for displaying a facsimile number" of a specific person, "Add Destination" button for adding address information on a specific person to a destination, and "Return" button for moving to a previous screen (a cell-phone mail personal address book list screen, a cell-phone mail personal address book for each Japanese syllabary list screen, or a cell-phone mail address book search list screen) by stopping the process.

When User 2 checks address information on a specific person and then selects "Add Destination" button, the cell-phone address book program informs a cell-phone mail program of specific person's name and e-mail address to set them to a destination and finishes the process. The cell-phone mail program which received the information adds the entered specific person's name and e-mail address to the list on a TO destination address editing screen (or a CC destination address editing screen), then generates a TO destination address editing screen (or a CC destination address editing screen) and sends the screen to the cell-phone WWW browser of the cellular phone.

Description of Cell-phone Mail Common Address Book Reference Process

When User 2 selects "To Common" button on a cell-phone mail personal address book list screen, the cell-phone address book program refers to address data stored in a common address book data storage area of an address book database 110b, then generates a cell-phone mail common address book list screen 1504 shown in FIG. 15 and sends the screen to the cell-phone WWW browser of the cellular phone.

The cell-phone mail common address book list screen 1504 is composed of "To Personal" button for moving to a cell-phone mail personal address book list screen 1501, an "area for displaying the number of registered addresses" of a common address book, "Search" button for searching data on a common address book, respective buttons for moving to a cell-phone mail common address book list for each Japanese syllabary 1506 by searching a common address book for each Japanese syllabary (Japanese "A" button, "KA" button, "SA" button, "TA" button, "NA" button, "HA" button, "MA" button, "YA" button, "RA" button and "WA" button for searching by each column of a table for Japanese syllabary, and an alphabet "A" button), an "area for displaying a list of the last five addresses" for displaying a list of five names of address information which have recently been referred to by User 2.

User 2 can search and refer to an address book and add specific person's name and e-mail address registered in a common address book to a TO destination or a CC destination of a piece of mail by manipulating the cell-phone mail common address book list screen.

When User 2 selects one of Japanese "A" button, "KA" button, "SA" button, "TA" button, "NA" button, "HA" button, "MA" button, "YA" button, "RA" button, "WA" button, or an alphabet "A" button on a cell-phone mail common address book list screen, the cell-phone address book program sorts and searches data on a common address book for each column of a table for Japanese syllabary (an alphabet "A" button is for a name beginning with an alphabet), generates a list of a cell-phone mail common address book for the column of a table for Japanese syllabary designated with a button and sends the list to the cell-phone WWW browser of the cellular phone.

The list of a cell-phone mail common address book for each Japanese syllabary screen 1506 is composed of an "area for displaying a list of addresses for each column of a table for Japanese syllabary" for displaying 20 names for each page by sorting the names for each column of a table for Japanese syllabary (for example, when User 2 selects Japanese "A" button, address data on names which begin with a column of "A" is sorted and displayed), "Next" button for moving to the next page, "Address Book" button for moving to a cell-phone mail common address book list screen.

User 2 can check a specific person's address by viewing and manipulating an address list for each column of a table for Japanese syllabary.

When User 2 selects one of names displayed in an "area for displaying a list of the last five addresses" on a cell-phone mail common address book list screen, or when User 2 selects one of names displayed in an "area for displaying an address list for each column" on a cell-phone mail common address book for each Japanese syllabary list screen, or when User 2 selects one of names displayed in an "area for displaying a list of search addresses" on a cell-phone mail address book search list screen displayed as a result of searching a common address book, the cell-phone address book program generates a cell-phone mail common address book viewing screen 1505 and sends the screen to the cell-phone WWW browser of the cellular phone.

The cell-phone mail common address book viewing screen 1505 is a screen for displaying details of specific person's address information. The screen is composed of an "area for displaying name" of a specific person, an "area for displaying a phonetic expression" of a specific person's name, an "area for displaying a name of a company" to which a specific person belongs, an "area for displaying an e-mail address" of a specific person, an "area for displaying a telephone number" of a specific person, an "area for displaying a facsimile number" of a specific person, "Add Destination" button for adding address information on a specific person to a destination, and "Return" button for moving to a previous screen (a cell-phone mail common address book list screen, a cell-phone mail common address book for Japanese syllabary list screen, or a cell-phone mail address book search list screen) by stopping the process.

When User 2 checks address information on a specific person and then selects "Add Destination" button, the cell-phone address book program informs a cell-phone mail program of a specific person's name and an e-mail address to set them to a destination and finishes the process. The cell-phone mail program which received the information sets the set specific person's name and e-mail address to a destination, stores it to a temporally area and adds it to a list of a TO destination address editing screen (or a CC destination address editing screen), and then generates a TO destination address editing screen (or a CC destination address editing screen) and sends the screen to the cell-phone WWW browser of the cellular phone.

Cell-phone Mail Address Book Search Process

When User 2 presses "Search" button on a cell-phone mail personal address book list screen (or presses "Search" button on a cell-phone mail common address book list screen), the cell-phone mail program creates a cell-phone mail address book searching screen 1507 shown in FIG. 15 and sends the screen to the cell-phone WWW browser of the cellular phone.

The cell-phone mail address book searching screen 1507 is composed of "Name" text box for entering a name to be searched for, "Phonetic Expression" text box for entering a phonetic expression for a name to be searched for, and "Search" button to start a search.

When User 2 enters at least either of a "name" to be searched for or a "phonetic expression" for a name to be searched for and then selects "Search" button, the cell-phone address book program refers to address data stored in a personal address book data storage area (or a common address book data storage area) for User 2 in an address book database 110b, searches address data matching the entered "name" (or a "phonetic expression" of a name), and generates a cell-phone mail address book search list screen 1508 from the result of the search and sends the screen to the cell-phone WWW browser of the cellular phone.

The cell-phone address book list screen 1508 displays a search address list which is searched and shows a name of an address. User 2 can check a searched address by viewing addresses displayed on a search address list.

Description of Title Editing Process

Figure 16:
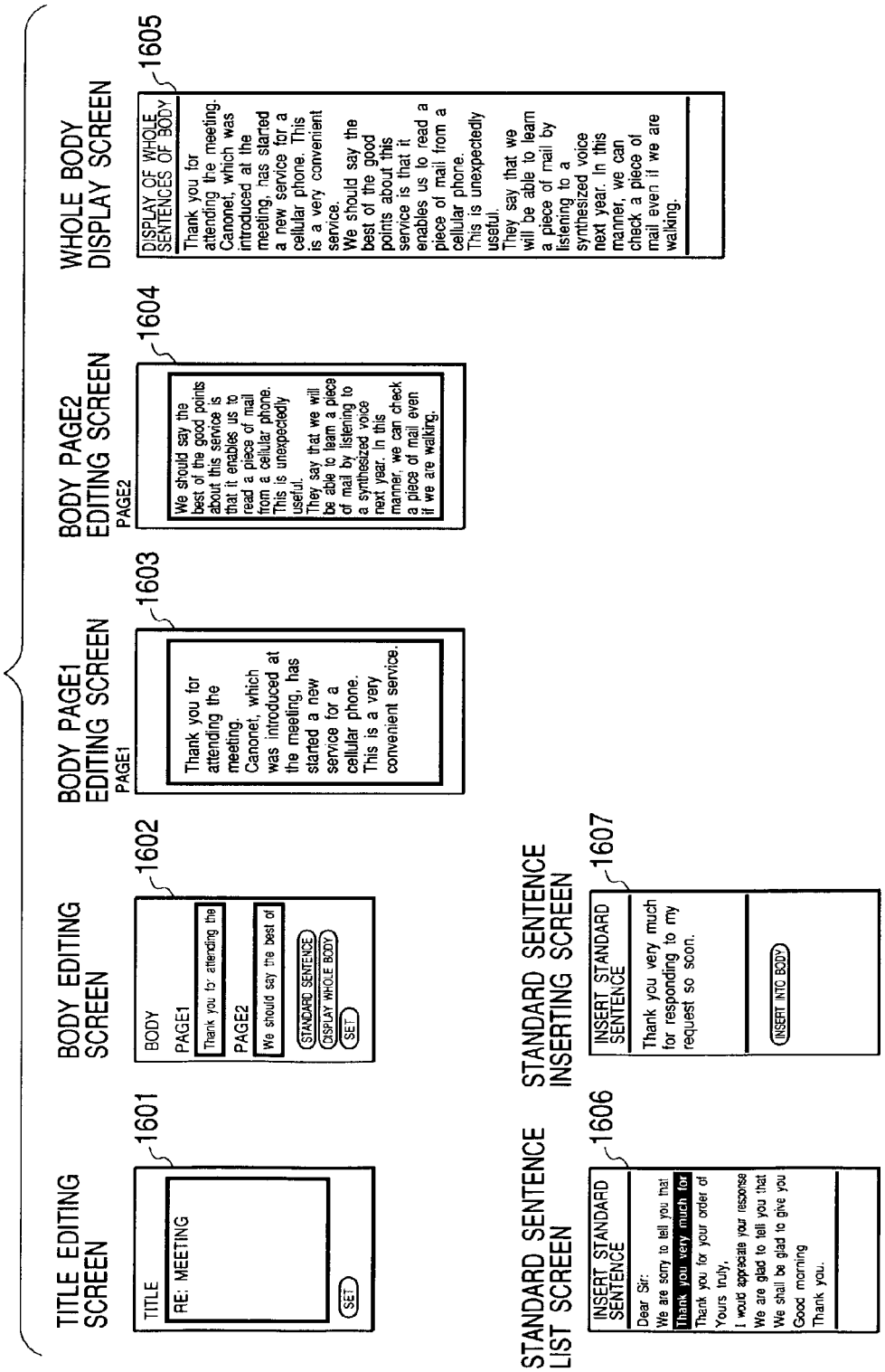
FIG. 16 is a display screen to be shown on a cellular phone.

When User 2 selects "Title" button on a mail creating/sending screen 1303 shown in FIG. 13, the cell-phone mail program generates a title editing screen 1601 shown in FIG. 16 and sends the screen to the cell-phone WWW browser of the cellular phone.

The title editing screen 1601 is composed of "Title" text box for entering a title and "Set" button for setting a title.

When User 2 enters a title in "Title" text box on a title editing screen and selects "Set" button, the cell-phone mail program sets the entered title to a title, stores it in a temporally area, and then generates a mail creating/sending screen 1303 shown in FIG. 13 and sends the screen to the cell-phone WWW browser of the cellular phone.

Description of Body Editing Process

When User 2 selects "Body" button on a mail creating/sending screen 1303 shown in FIG. 13, the cell-phone mail program generates a body editing screen 1602 shown in FIG. 16 and sends the screen to the cell-phone WWW browser of the cellular phone.

The body editing screen 1602 is composed of "Page 1" and "Page 2" text boxes for entering 512 characters respectively, "Standard Sentence" button for moving to a standard sentence list screen 1606 to insert a standard sentence, "Display Whole Body" button for displaying whole of the entered body, and "Set" button for setting the entered body.

The number of characters which can be entered in each text box is considered to be 512 in the embodiment due to specifications of a cellular phone.

To enter a body, User 2 first enters text in "Page 1" text box. If the number of characters exceeds 512, User 2 keeps on entering characters in "Page 2" text box. User 2 can enter the body including up to 1024 characters by using both "Page 1" and "Page 2" text boxes.

More specifically, when User 2 selects "Page 1" text box on a body editing screen, a display on a cellular phone changes to a body page 1 editing screen 1603 for a user to enter into the text box, and when User 2 selects "Page 2" text box on a body editing screen, a display on a cellular phone changes to a body page 2 editing screen 1604 for a user to enter into the text box, so that User 2 enters a body text on the body page 1 editing screen or on the body page 2 editing screen. When User 2 confirms the entered sentences by such a way as clicking on a confirmation button on a cellular phone when the screen of the phone displays a body page 1 editing screen (or a body page 2 editing screen), the entered body is confirmed to be entered in "Page 1" text box (or "Page 2" text box) and the display changes to a body editing screen 1602.

Description of Standard Sentence Inserting Process at Editing Body

To insert a standard sentence into a body which is being entered, User 2 selects "Standard Sentence" button on a body editing screen 1602. When the "Standard Sentence" button is selected, a body which have been entered in "Page 1" and "Page 2" text boxes is sent from the cellular phone to a cell-phone mail program and stored in a temporally area. Then the cell-phone mail program reads out fields from 21 to 30 within a cell-phone user information storage area for User 2 in a user information database 110a shown in FIG. 1, generates a standard sentence list screen 1606 shown in FIG. 16 and sends the screen to the WWW browser of the cellular phone.

More specifically, the cell-phone mail program reads out character strings of standard sentences and a frequency of use for each standard sentence stored in fields from 21 to 30 within a cell-phone user information storage area, generates a standard sentence list displaying standard sentences in descending order of frequency, generates a standard sentence list screen and sends the screen to the cell-phone WWW browser of the cellular phone. In an alternative embodiment, the cell phone mail program may read out character strings of standard sentences and the last used date and time for each standard sentence stored in fields from 21 to 30 within a cell-phone user information storage area, generate a standard sentence list displaying standard sentences in the order of date and time, generate a standard sentence list screen and send the screen to the cell-phone WWW browser of the cellular phone.

The standard sentence list screen 1606 is composed of an "area for displaying a standard sentence list" for displaying a leading eight characters to enable each standard sentence from 1 to 10 to be distinguished.

When User 2 views a standard sentence list and selects one of the standard sentences displayed in an "area for displaying a standard sentence list", the cell-phone mail program generates a standard sentence inserting screen 1607 for displaying the whole of the selected standard sentence and sends the screen to the cell-phone WWW browser of the cellular phone.

The standard sentence inserting screen 1607 is composed of an area for displaying a whole of the selected standard sentence and "Insert into Body" button for inserting the standard sentence.

When User 2 selects "Insert into Body" button, the cell-phone mail program adds a body of a standard sentence being displayed to the end of a body which has been entered and stored in a temporally area, then creates a body editing screen 1602 with the standard sentence being added to a body in Page 1 text box and Page 2 text box, and sends the screen to the cell-phone WWW browser of the cellular phone.

In other words, when a body is entered only in "Page 1" text box on a body editing screen 1602 and "Standard Sentence" button is selected, the display changes to a standard sentence list screen 1606. When "Insert into Body" button is selected on a standard sentence inserting screen 1607 afterwards, the cell-phone mail program generates a body editing screen 1602 with the selected standard sentence being added at the end of the body which has been entered in "Page 1" text box, and sends the screen to the cell-phone WWW browser of the cellular phone. When "Standard Sentence" button is selected with a body being entered in "Page 2" text box on a body editing screen 1602, the display changes to a standard sentence list screen 1606. When "Insert into Body" button is selected on a standard sentence inserting screen 1607 afterwards, the cell-phone mail program generates a body editing screen 1602 with the selected standard sentence being added at the end of a body which has been entered in "Page 2" text box and sends the screen to the cell-phone WWW browser of the cellular phone.

When "Standard Sentence" button is selected with a body being entered only in "Page 1" text box on a body editing screen 1602, the display changes to a standard sentence list screen 1606. When "Insert into Body" button is selected on a standard sentence inserting screen 1607 afterwards and if the total number of characters of a body and a standard sentence which have been entered exceeds 512, the cell-phone mail program divides the standard sentence at the count of (512— the number of characters of a body) by character from the beginning and adds characters of the first part to a body to make the first part entered in "Page 1" text box, while making the latter part entered in "Page 2" text box, and then generates a body editing screen 1602 and sends the screen to the cell-phone WWW browser of the cellular phone. In such a manner, a standard sentence can be entered without interruption during insertion of the standard sentence, and operability in entering operation is improved.

When a standard sentence is used, the cell-phone mail program increments a value in a frequency of use area in a field corresponding to the selected standard sentence of fields from 21 to 30 within a cell-phone user information storage area by one, while storing the date and time of inserting the selected standard sentence as the last date and time of use.

Description of Whole Body Viewing Process at Editing the Body

When User 2 selects "Display Whole Body" button on a body editing screen 1602, each character string entered in "Page 1" and "Page 2" text boxes is sent from the cellular phone to the cell-phone mail program. The cell-phone mail program generates a whole body display screen 1605 for displaying a whole body by joining each part entered in "Page 1" and "Page 2" text boxes and then sends the screen to the cell-phone WWW browser of the cellular phone.

User 2 can check the contents of a whole body which the user has entered at a time by viewing characters displayed in a whole body display area.

Description of Selecting of Set Button at Editing a Body

When User 2 selects "Set" button on a body editing screen 1602, the cell-phone mail program sets whole characters entered in "Page 1" and "Page 2" text boxes as a body by joining them, stores the body in a temporally area, and then generates a mail creating/sending screen 1303 and sends the screen to the cell-phone WWW browser of the cellular phone. The mail creating/sending screen 1303 displays some of the leading characters of a body.

Description of Save Draft and Write Draft Process

When User 2 selects "Save Draft" button during creating a piece of mail on a mail creating/sending screen 1303, the cell-phone mail program saves information related to a piece of mail stored in a temporally area into a mail storage area in a user information database 110a.

When User 2 selects "Read Draft" button on a mail creating/sending screen 1303, the cell-phone mail program reads out information related to a piece of mail stored in a mail storage area in a user information database 110a, sets in respective entries, stores it in a temporally area, and then creates a mail creating/sending screen 1303 and sends the screen to the cell-phone WWW browser.

Mail Sending Process

When User 2 creates a piece of mail by manipulating a mail creating/sending screen 1303 as mentioned above and selects "Send" button, the cell-phone mail program starts a mail sending process.

In other words, the cell-phone mail program initially checks "Signature" check box to see if it has a check mark. If the check box has a check mark, the cell-phone mail program reads in a signature character string in field 20 within a cell-phone user information storage area in a user information database 110a and adds the string to the end of a mail body. Next, the cell-phone mail program checks "BCC to me" check box to see if it has a check mark. If the check box has a check mark, the cell-phone mail program adds an e-mail address for PC of User 2 to a BCC destination contained in mail header information on the created mail.

Then the cell-phone mail program accesses a cell-phone MTA program 108a of a cell-phone mail server 108 and asks for distribution of a piece of e-mail. The MTA program which is asked for distribution of a piece of e-mail distributes the mail through SMTP (simple mail transfer protocol). In From field indicating the source of the distributed mail, an e-mail address for PC is set. In this manner, a piece of e-mail sent to an e-mail address for PC of User 2 which is added to a Bcc destination can be prevented from being forwarded to a cell-phone mail server.

Description of Management Process

Figure 17:
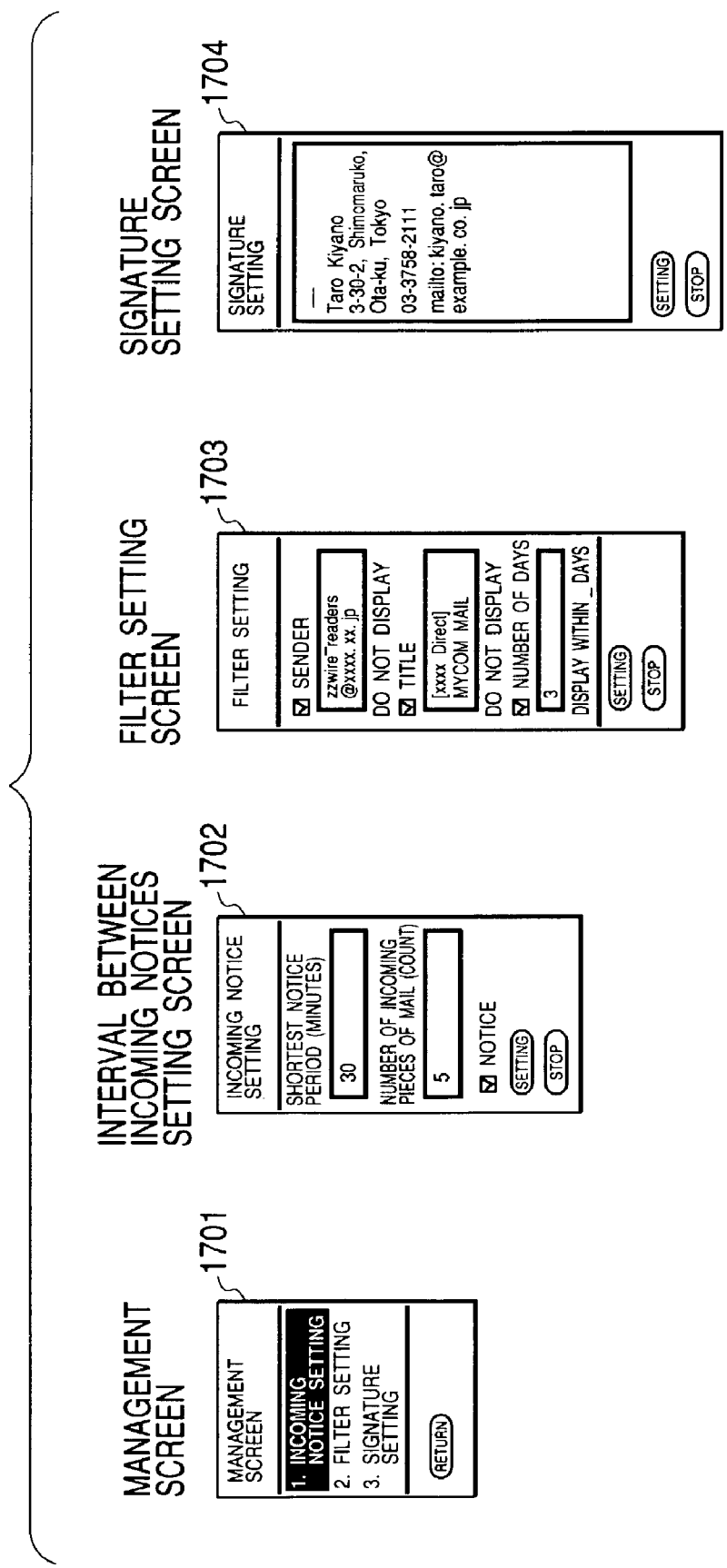
FIG. 17 is a display screen to be shown on a cellular phone.

When User 2 selects "Management Screen" button on one of an unread mail list screen 1101, a read mail list screen 1202, a stored mail list screen 1203 and a sent mail list screen 1301, the cell-phone mail program generates a management screen 1701 shown in FIG. 17 and sends the screen to the cell-phone WWW browser of the cellular phone.

The management screen 1701 is composed of an "Incoming Notice Setting" link character string for moving to an incoming notice setting screen 1702, a "Filter Setting" link character string for moving to a filter setting screen 1703, and a "Signature setting" link character string for moving to a signature setting screen 1704.

Description of Incoming Notice Setting Process

When User 2 selects an "Incoming Notice Setting" link character string on a management screen 1701, the cell-phone mail program generates an incoming notice setting screen 1702 and sends the screen to the cell-phone WWW browser of the cellular phone.

The incoming notice setting screen 1702 is composed of "Shortest Notice Period" text box for setting how many minuets should elapse from the sending of the last incoming notice mail to send another incoming notice mail, "The Number of Newly Arrived Pieces of Mail" text box for setting how many pieces of mail should arrive since the sending of the last incoming notice mail to send another incoming notice mail, "Notice" check box for setting whether an incoming notice mail should be sent or not, "Set" button for storing a value entered by User 2 into a database, and "Stop" button for stopping the process and returning to a management screen.

When User 2 enters values of "Shortest Notice Period" text box and "The Number of Newly Arrived Pieces of Mail" text box, sets "Notice" check box, and then selects "Set" button, the cell-phone mail program stores each value set by User 2 in each corresponding field (more specifically, fields 9, 10, and 11) within a cell-phone user information storage area in a user information database 110*a*.

Description of Filter Setting Process

When User 2 selects a "Filter Setting" link character string on a management screen 1701, the cell-phone mail program generates a filter setting screen 1703 and sends the screen to the cell-phone WWW browser of the cellular phone.

The filter setting screen 1703 is composed of "Sender" check box for setting whether a sender filter should function or not, "Sender" text box for setting a sender filter character string, "Title" check box for setting whether a title filter should function or not, "Title" text box for setting a title filter character string, "Number of Date" check box for setting whether a number of date filter should function or not, "Number of Date" text box for setting a date of a number of date filter, "Set" button for storing a value entered by User 2 in a database, and "Stop" button for stopping the process and returning to a management screen.

When User 2 sets "Sender" check box, "Sender" text box, "Title" check box, "Title" text box, "Number of Date" check box, and "Number of Date" text box and then selects "Set" button, the cell-phone mail program stores each value set by User 2 in each corresponding field (more specifically, fields 13, 6, 14, 7, 15, and 8) within a cell-phone user information storage area in a user information database 110*a*.

Description of Signature Setting Process

When User 2 selects "Signature Setting" link character string on a management screen 1701, the cell-phone mail program generates a signature setting screen 1704 and sends the screen to the cell-phone WWW browser of the cellular phone.

The signature setting screen 1704 is composed of "Signature" text box for setting a signature character string, "Set" button for storing a value entered by User 2 in a database, and "Stop" button for stopping the process and returning to a management screen.

When Use 2 enters a character string in "Signature" text box and then selects "Set" button, the cell-phone mail program stores a signature character string entered by User 2 in field 20 within a cell-phone user information storage area in a user information database 110*a*.

Description of Address Book Operation

The process where User 2 manipulates an address book by controlling a WWW browser of a cellular phone will now be described with reference to FIGS. 18 and 19.

First, User 2 selects a URL for cell-phone address book program contained in a piece of e-mail. Then, a WWW browser of the cellular phone starts and initiates an access to a URL for cell-phone address book program. When the URL for cell-phone address book program is accessed by a WWW browser of the cellular phone, an authentication program 106*a* of the WWW server 106 starts and generates amuser authentication screen 1001 and sends the screen to the cell-phone WWW browser of the cellular phone. When User 2 enters a password required for authentication, the authentication program searches a user information database by using user identification ID information accompanying the URL for cell-phone address book program and the entered password information, and performs authentication by referring to the user information data. If the authentication succeeds, the authentication program generates an authentication ID, stores the authentication ID in association with the user ID into an authentication database, and sets an authentication ID timer to a specific period of time. Then the authentication program starts a cell-phone address book program 109*c* of a cell-phone WWW server 109 and passes the generated and stored authentication ID to the cell-phone address book program.

The started cell-phone address book program refers to a personal address book data storage area for User 2 in an address book database 110*b* shown in FIG. 1, reads in address data, generates a personal address book list screen 1801 shown in FIG. 18 and sends the screen to the cell-phone WWW browser of the cellular phone.

The personal address book list screen 1801 is also displayed when "Address Book" is selected on a menu screen 1002.

Description of Personal Address Book Viewing Process

Figure 19:
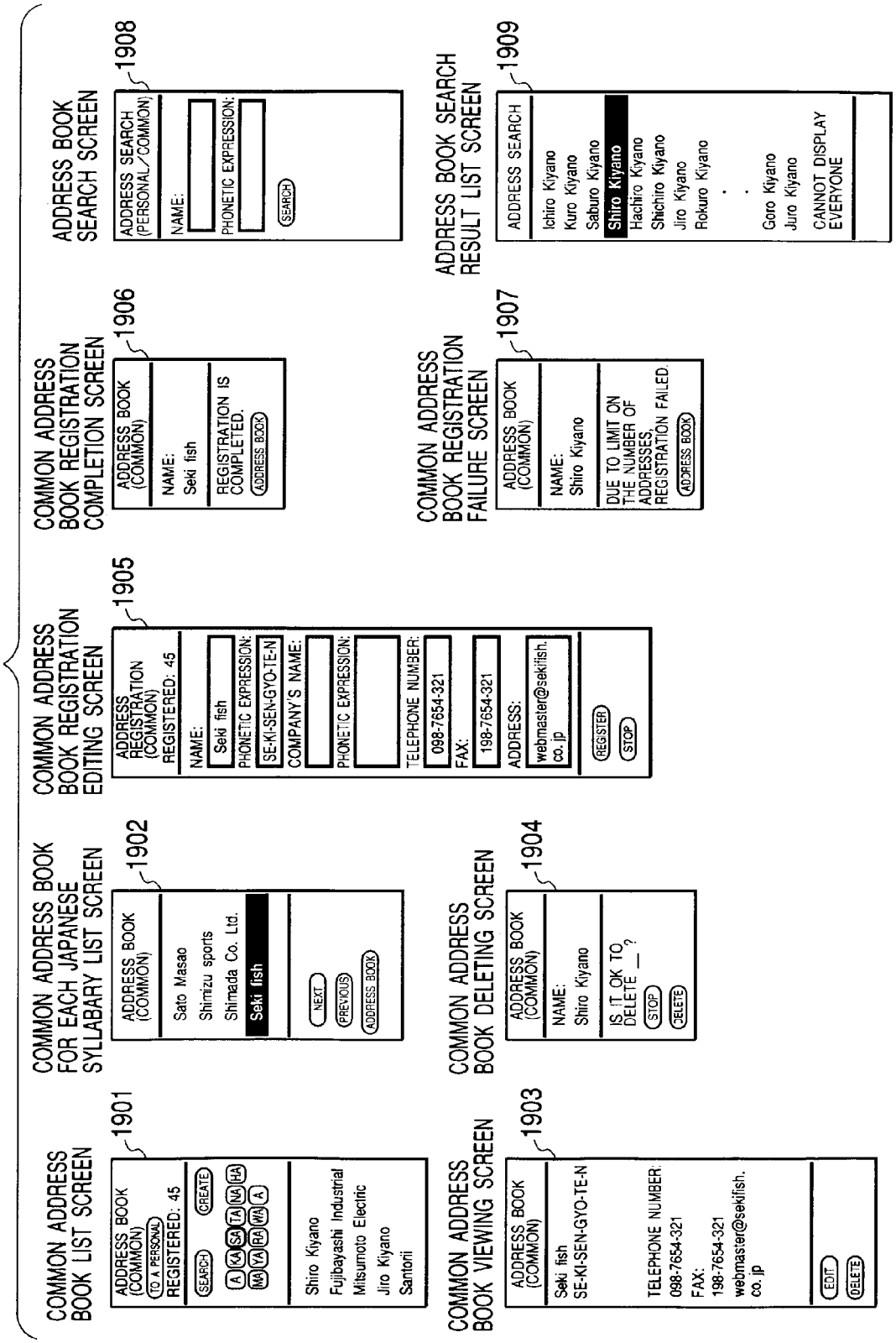
FIG. 19 is a display screen to be shown on a cellular phone.

The personal address book list screen 1801 is composed of "To Common" button for moving to a common address book list screen 1901 shown in FIG. 19, an "area for displaying the number of registered addresses" of a personal address book, "Search" button for searching data on a personal address book, respective buttons for moving to a personal address book list for each Japanese syllabary designated by 1804 shown in FIG. 18 with a personal address book being searched by each column of a table for Japanese syllabary (Japanese "A" button, "KA" button, "SA" button, "TA" button, "NA" button, "HA" button, "MA" button, "YA" button, "RA" button and "WA" button and an alphabet "A" button), an "area for displaying a list of the last five addresses" for displaying a list of five names of address information which have recently been referred to by User 2, and "Menu" button for moving to a menu screen 1003 shown in FIG. 10.

Description of Personal Address Book for Each Japanese Syllabary List Viewing Process When User 2 selects one of respective buttons for moving to a personal address book list screen (Japanese "A" button, "KA" button, "SA" button, "TA" button, "NA" button, "HA" button, "MA" button, "YA" button, "RA" button, "WA" button, or an alphabet "A" button), the cell-phone address book program sorts and searches data on a personal address book for each column of a table for Japanese syllabary, generates a list of a personal address book for each Japanese syllabary and sends the list to the cell-phone WWW browser of the cellular phone.

The personal address book for each Japanese syllabary list screen 1804 is composed of an address list for sorting names by each column of a table for Japanese syllabary and displaying 20 names for each page (When User 2 selects Japanese "A" button, address data on names which begin with a column of Japanese "A" is sorted and the names are displayed in descending order.), "Next" button for moving to the next page, "Previous" button for moving to the previous page, and "Address Book" button for moving to a personal address book list screen.

User 2 can check a specific person's address by viewing and manipulating an address list for each column of a table for Japanese syllabary.

Personal Address Book Viewing Screen

When User 2 selects one of addresses displayed in an "area for displaying a list of the last five addresses" on a personal address book list screen, or when User 2 selects one of addresses displayed in an "area for displaying an address list for each column of table for Japanese syllabary" on a personal address book list for each Japanese syllabary, or when User 2 selects one of addresses registered in a personal address book displayed in an "area for displaying a search address list" on an address book search result list 1909, the cell-phone address book program generates a personal address book viewing screen 1802 and sends the screen to the cell-phone WWW browser of the cellular phone.

The personal address book viewing screen 1802 is a screen for displaying details of specific person's address information. The screen is composed of an "area for displaying a name" of a specific person, an "area for displaying a phonetic expression" of a specific person's name, an "area for displaying a name of a company" to which a specific person belongs, an "area for displaying an e-mail address" of a specific person, an "area for displaying a telephone number" of a specific person, an "area for displaying a facsimile number" of a specific person, "Edit" button for moving to a personal address book registration editing screen 1805, and "Delete" button for moving to a personal address book delete screen 1803.

When User 2 views a personal address book viewing screen and selects a specific person's telephone number, a telephone function of the cellular phone starts operating and automatically dials the selected telephone number.

When User 2 views a personal address book viewing screen and selects a specific person's e-mail address, an e-mail function of the cellular phone starts operating and displays a piece of e-mail sending screen on the cellular phone with the selected e-mail address being a destination.

Description of Personal Address Book Deleting Process

When User 2 selects "Delete" button on a personal address book viewing screen, the cell-phone address book program generates a personal address book delete screen 1803 and sends the screen to the WWW browser of the cellular phone. The personal address book delete screen 1803 is composed of an "area for displaying a name" of a specific person to be deleted, "Stop" button for stopping the deleting process, and "Delete" button for performing the deleting process.

When User 2 selects "Delete" button on a personal address book delete screen, the cell-phone, address book program deletes the selected address data from a personal address book data storage area for User 2 in an address book database 110b, and then generates a personal address book list screen and sends the screen to the cell-phone WWW browser of the cellular phone.

Description of Personal Address Book Registration Editing Process

When User 2 selects "Register" button on a personal address book list screen 1801, the cell-phone address book program generates a personal address book registration editing screen 1805 and sends the screen to the cell-phone WWW browser of the cellular phone. When User 2 selects "Edit" button on a personal address book viewing screen 1802, the cell-phone address book program sets the current address information to corresponding entries and then generates a personal address book registration editing screen 1805 and sends the screen to the WWW browser of the cellular phone.

The personal address book registration editing screen 1805 is composed of "Name" text box for setting a specific person's name, "Phonetic Expression for Name" text box for setting a phonetic expression for a specific person's name, "Company Name" text box for setting a name of a company to which a specific person belongs, "Phonetic Expression for Company Name" text box for setting a phonetic expression for a name of a company to which a specific person belongs, "Telephone Number" text box for setting a telephone number of a specific person, "FAX" text box for setting a facsimile number of a specific person, "Address" text box for setting a specific person's e-mail address, "Register" button for directing the set address information to be registered, and "Stop" button for stopping a personal address book registration editing process.

When User 2 sets respective pieces of address book information on a personal address book registration editing screen and then selects "Register" button, the cell phone address book program stores the respective pieces of set address book information in a personal address book data storage area for User 2 in an address book database 110b.

At this moment, if the cell-phone address book program succeeds in storing the information, it generates a personal address book registration completion screen 1806 and sends the screen to the cell-phone WWW browser of the cellular phone. If it fails in storing the information, the cell-phone address book program generates a personal address book registration failure screen 1807 and sends the screen to the cell-phone WWW browser of the cellular phone.

Description of a Common Address Book Viewing Process

When User 2 selects "To Common" button on a personal address book list screen, the cell-phone address book program refers to a common address book data storage area in an address book database 110b, reads in address data, generates a common address book list screen 1901 shown in FIG. 19 and sends the screen to the cell-phone WWW browser of the cellular phone. The common address book is an address book which can be viewed by other users.

The common address book list screen 1901 is composed of "To Personal" button for moving to a personal address book list screen 1801, an "area for displaying the number of registered addresses" of a common address book, "Search" button for searching data on a common address book, respective buttons for moving to a common address book list for each Japanese syllabary with a common address book being searched by each column of a table for Japanese syllabary (Japanese "A" button, "KA" button, "SA" button, "TA" button, "NA" button, "HA" button, "MA" button, "YA" button, "RA" button and "WA" button, and an alphabet "A" button), an "area for displaying a list of the last five addresses" for displaying a list of five names of address information which have recently been referred to by User 2, and "Menu" button for moving to a menu screen 1003.

Description of a Common Address Book List for Each Japanese syllabary Viewing Process When User 2 selects one of respective buttons for moving from a common address book list screen to a common address book list for each Japanese syllabary screen (Japanese "A" button, "KA" button, "SA" button, "TA" button, "NA" button, "HA" button, "MA" button, "YA" button, "RA" button, "WA" button or an alphabet "A" button), the cell-phone address book program sorts and searches data on a common address book by each column of a table for Japanese syllabary, generates a list of a common address book for each Japanese syllabary and sends the list to the cell-phone WWW browser of the cellular phone.

The common address book list for each Japanese syllabary screen 1902 is composed of an address list for each column of a table for Japanese syllabary with names being sorted for each column of a table for Japanese syllabary and displayed by 20 for each page (for example, when User 2 selects Japanese "A" button, address data on names which begin with a column of "A" is sorted and displayed in descending order of Japanese syllabary), "Next" button for moving to the next page, "Previous" button for moving to the previous page, and "Address Book" button for moving to a common address book list screen.

User 2 can check a specific person's address by viewing and manipulating the address list for each column of a table for Japanese syllabary.

Common Address Book Viewing Screen

When User 2 selects one of addresses displayed in an "area for displaying a list of the last five addresses" on a common address book list screen, or when User 2 selects one of addresses displayed in an "area for displaying an address list for each column of a table for Japanese syllabary" on a common address book list for each Japanese syallabary screen, or when User 2 selects one of addresses registered in a common address book displayed in an "area for displaying a search address list" on an address book search result list screen, the cell-phone address book program generates a common address book viewing screen 1903 and sends the screen to the cell-phone WWW browser of the cellular phone.

The common address book viewing screen 1903 is a screen for displaying details of specific person's address information. The screen is composed of an "area for displaying a name" of a specific person, an "area for displaying a phonetic expression" of a specific person's name, an "area for displaying a name of a company" to which a specific person belongs, an "area for displaying an e-mail address" of a specific person, an "area for displaying telephone number" of a specific person, an "area for displaying facsimile number" of a specific person, "Edit" button for moving to a common address book registration editing screen 1905, and "Delete" button for moving to a personal address book delete screen 1904.

When User 2 views the common address book viewing screen and then selects a specific person's telephone number, a telephone function of the cellular phone starts operating and automatically dials the selected telephone number. When User 2 views the common address book viewing screen and then selects a specific person's e-mail address, an e-mail address function of the cellular phone starts operating and displays a piece of e-mail sending screen of the cellular phone with the e-mail address being a destination.

Description of Common Address Book Deleting Process

When User 2 selects "Delete" button on a common address book viewing screen, the cell-phone address book program generates a common address book delete screen 1904 and sends the screen to the WWW browser of the cellular phone. The common address book delete screen 1904 is composed of an "area for displaying a name" of a specific person, "Stop" button for directing to stop the deleting process, and "Delete" button for directing to perform the deleting process.

When User 2 selects "Delete" button on a common address book delete screen, the cell-phone address book program deletes the selected address data from a common address book data storage area in an address book database 110b, and then generates a common address book list screen and sends the screen to the WWW browser of the cellular phone.

Description of Common Address Book Registration Editing Process

When User 2 selects "Register" button on a common address book list screen, the cell-phone address book program generates a common address book registration editing screen 1905 and sends the screen to the WWW browser of the cellular phone. When User 2 selects "Edit" button on a common address book viewing screen, the cell-phone address book program sets the current address information to each corresponding entry and then generates a common address book registration editing screen 1905 and sends the screen to the cell-phone WWW browser of the cellular phone.

The common address book registration editing screen 1905 is composed of "Name" text box for setting a specific person's name, "Phonetic Expression of Name" text box for setting a phonetic expression for a specific person's name, "Company Name" text box for setting a name of a company to which a specific person belongs, "Phonetic Expression for Company Name" text box for setting a phonetic expression for a name of a company to which a specific person belongs, "Telephone Number" text box for setting a specific person's telephone number, "FAX" text box for setting a specific person's facsimile number, "Address" text box for setting a specific person's e-mail address, "Register" button for directing to register the set address information, and "Stop" button for directing to stop the common address book registration editing process.

When User 2 enters on a common address book registration editing screen the respective pieces of address book information and then selects "Register" button, the cell-phone address book program stores the respective pieces of entered address book information into a common address book data storage area in an address book database 110b.

If the cell-phone address book program succeeds in storing the information, it generates a common address book registration completion screen 1906 and sends the screen to the cell-phone WWW browser of the cellular phone. If it fails in storing the information, the cell-phone address book program generates a common address book registration failure screen 1907 and sends the screen to the cell-phone WWW browser of the cellular phone.

Address Book Search Process

When User 2 presses "Search" button on a personal address book list screen (or presses "Search" button on a common address book list screen), the cell-phone mail program generates an address book search screen 1908 and sends the screen to the cell-phone WWW browser of the cellular phone.

The cell-phone mail address book search screen 1908 is composed of "Name" text box for entering a name to be searched for, "Phonetic Expression" text box for entering a phonetic expression for a name to be searched for, and "Search" button for directing to start a search.

When User 2 enters at least one of a name to be searched for and a phonetic expression for a name to be searched for, and then selects "Search" button, the cell-phone address book program refers to address data stored in a personal address book data storage area (or a common address book data storage area) for User 2 in an address book database 110*b*, searches for address data which matches the entered name or phonetic expression for a name and then generates an address book search result list screen 1909 and sends the screen to the cell-phone WWW browser of the cellular phone.

The cell-phone mail address book search result list screen 1909 is composed of a search address list for displaying a name of a searched address.

User 2 can check a searched address by viewing an address displayed on a search address list.

Description of Session Information Storing Process

The cell-phone mail program and the cell-phone address book program use two types of ID's associated with each other to perform screen creation. One of the ID's is a session ID for a cell-phone WWW server to use; another is an authentication ID described above. As mentioned above, when a user accesses a URL for cell-phone mail program or a URL for cell-phone address book program and logs in on a user authentication screen, a desired screen is displayed. The cell-phone mail program and the cell-phone address book program generate session information at generating a screen and stores the information into a temporally area (on memory) as a session object. Into this session object, user information consisting of an authentication ID and a user ID are also stored. Information regarding to the authentication ID and the user ID stored as a session object is information commonly used for processes in a cell-phone mail program and a cell-phone address book program (i.e., it is not information associated with one or more specific screen.).

As screen change information used at changing screens, screen information on the current display is embedded as a part of a URL indicating a "linked to " against a link displayed on a screen, or screen information is embedded by using hidden tag of HTML.

The above-mentioned relation is shown in detail in FIGS. from 21 to 26. Screen source HTML for FIG. 21 is shown in FIG. 24, screen source HTML for FIG. 22 is shown in FIG. 25, and screen source HTML for FIG. 23 is shown in FIG. 26, respectively.

FIG. 21 shows an example of an unread mail list screen displayed immediately after User 2 accessed and logged in a URL for cell-phone mail program. FIG. 22 shows an example of a read mail list screen displayed when User 2 presses Read Mail List button contained in 21001 shown in FIG. 21. Management screen of FIG. 23 is displayed when a user presses Management Screen button contained in 22001 shown in FIG. 22.

A link tag (<A HREF='(several passages omitted) &list=1&lp=1">), to which "&list=1&lp=1" designated by 24001 in FIG. 24 is a tag indicating a link to a mail at the top of a mail list shown in FIG. 21. list=1 written in 24001 indicates a screen number of currently displayed FIG. 21, while lp=1 indicates a page number (if there are a plurality of pages). 24002 is information embedded in the screen by means of hidden tag belonging to FORM tag, which is screen information same as above described 24001 (screen information on FIG. 21). A purpose of repeatedly storing the same information is to enable screen information for distinguishing the currently displayed screen from others to be notified when the link is selected because a link tag to which 24001 belongs cannot use hidden tag. The hidden tag enables screen information for distinguishing the currently displayed screen from others to be notified in FORM tag. By notifying screen information on the currently displayed screen by using 24001, a user can return to a screen shown in FIG. 21 from a linked screen of 24001, because information needed for returning to the screen shown in FIG. 21 can be included when a linked screen is generated.

25001 shown in FIG. 25 is a link to a screen, which displays details of a selected piece of mail as 24001 with list=2 being a screen number of FIG. 22 and lp=1 being a page number. 25002 is also information embedded in the screen by using hidden tag which belongs to FORM tag, which is the information same as the above-described 25001 (screen information of FIG. 22).

Hidden tag for 26001 of FIG. 26 is list=2, lp=1. This is information used when Return button of 23001 is selected, with screen information notified at the selection of 22001 in FIG. 22 having been embedded as a screen to return when screen information for FIG. 23 is created. When Return button is controlled, information on a page to return is obtained from here. This information list=2, lp=1 is the screen number and page number of FIG. 22.

As a session object stores user information, when a user requires a process to the cell-phone mail program or cell-phone address book program by controlling a link or a button on a screen, the cell-phone mail program or the cell-phone address book program initially checks the session object to see if this session object exists on memory and valid or not. In the embodiment, validity of a session is determined by using time. For example, the cell-phone mail program or the cell-phone address book program determines a session object valid if it elapses three hours or less since the object was generated. If the session object is determined to be valid, each program continues to perform the indicated process. If the session object is determined to be invalid, an error message is displayed and the process of the cell-phone mail program or the cell-phone address book program ends.

If the session object is determined to be valid, validity of an authentication ID obtained from the session object is checked with an authentication database of a database server. Absence of the corresponding authentication ID in the authentication database means that a timer for the authentication ID has concluded its predetermined time. In this case, a user authentication screen 1001 is displayed to require a user to log in again. As session ID includes user information, a user ID (a mail address) is not required on the screen.

Description of Applications Link

In the embodiment, a database server is an independent server from a cell-phone WWW server where the cell-phone mail program and the cell-phone address book program are running. Therefore, the database server is also accessible from a server where other applications are running (e.g., WWW server 106) and can manage applications by using the same authentication ID.

106 and 109 in FIG. 1 are a WWW server for PC and a cell-phone WWW server, respectively. A WWW server 106 and a cell-phone WWW server 109 access a database server 110 in common and execute an application according to an authentication ID.

A user ID and screen information are stored along with an authentication ID in an authentication database 110c. When User 2 manipulates a specific address editing screen in a personal address book shown in FIG. 27 by controlling a client PC designated by 102, an authentication database stores an authentication ID and a user ID with adid indicating an address ID, which is necessary information for reconfiguring the screen by a mobile information terminal, phki indicating a telephone book personal, op ad indicating that it is a management screen. If User 2 finishes controlling PC 102 at this moment, and afterwards accesses a URL for cell-phone mail program with a cellular phone, views a user authentication screen and enters a password required for authentication while the authentication ID remains in the authentication database, the cell-phone program authenticates by searching the user information database with a user ID accompanying a URL for cell-phone mail program and the entered password information, and referring to user information data.

If the authentication succeeds, the authentication program determines whether there is a valid authentication ID associated with the user ID that succeeded the authentication by searching the authentication database. If a valid authentication ID does not exist, the authentication program generates an authentication ID, stores the authentication ID into the authentication database in association with the user ID, and sets an authentication ID timer to a specific time period. Next, the authentication program starts a cell-phone mail program 109b in a cell-phone WWW server 109 shown in FIG. 1 and passes the generated and stored authentication ID to the cell-phone mail program. As there is no screen information accompanying an authentication ID, the started cell-phone mail program refers to pieces of mail stored in a mail storage area for User 2 in a mail spool of the cell-phone mail server 108, searches for a unread piece of mail, extracts the title of the mail, generates a unread mail list screen 1101, and sends the screen to the cell-phone WWW browser of the cellular phone.

As a result of searching the authentication database, if a valid authentication ID associated with the user ID that succeeded the authentication exists, the authentication program resets the valid authentication ID timer. Then if screen information accompanying the authentication ID exists, the authentication program obtains information required for reproducing the accompanying screen information on a mobile information terminal 103 and passes the information to the cell-phone mail program. If corresponding ones to the above-described aid, phki, opad exists as the accompanying screen information, the cell-phone mail program passes the screen information to the cell-phone address book program, which generates a screen information source shown in FIG. 29 because this accompanying screen information is for a screen at editing the address book. FIG. 29 will be displayed on a cellular phone as FIG. 28. FIG. 28 is displayed on a corresponding screen that can display screen information during editing on a PC on a cellular phone.

As mentioned above, the present invention enables linkage among different applications of different devices by applying an authentication ID commonly used for a session object managed locally on a server where respective applications are running. In addition, as a data base server, which manages the authentication ID, is accessible from a plurality of devices, and a status of work can be stored, if the same user uses different devices, a status of work can be taken over and also the user's working efficiency can be improved.

Moreover, the fact that the same management (authentication program) is employed in both a server providing a service for a PC browser and a server providing a service for a cellular phone facilitates keeping track of user's status of use or management of user information.

What is claimed is:

1. A server apparatus comprising:
   a storage control unit adapted to control, when a user edits information about a mail function by operating on a first terminal apparatus, a memory to store the edited information, a user ID for identifying the user and an authentication ID which is made invalid when a predetermined time has elapsed, in correspondence to each other;
   an authentication unit adapted to execute, when the user enters a password into a second terminal apparatus of a different type from the first terminal apparatus after the control by the storage control unit, a user authentication using the entered password;
   a determination unit adapted to determine whether the predetermined time has elapsed since the editing of the information about the mail function by discriminating whether a valid authentication ID exists in the memory in correspondence to a user ID for identifying the user who operates on the second terminal apparatus, if the user authentication is successfully executed by the authentication unit; and
   a processing unit adapted to execute processing such that the edited information stored in the memory in correspondence to the valid authentication ID is displayed in the second terminal apparatus, if the determination unit determines that the predetermined time has not elapsed, and execute processing such that unread portion of the information about the mail function is displayed in the second terminal apparatus using the user ID for identifying the user who operates on the second terminal apparatus, if the determination unit determines that the predetermined time has elapsed.

2. A method comprising: controlling, when a user edits information about a mail function by operating on a first terminal apparatus, a memory to store the edited information, a user ID for identifying the user and an authentication ID which is made invalid when a predetermined time has elapsed, in correspondence to each other;
   executing, when the user enters a password into a second terminal apparatus of a different type from the first terminal apparatus after the controlling step, a user authentication using the entered password;
   determining whether the predetermined time has elapsed since the editing of the information about the mail function by discriminating whether a valid authentication ID exists in the memory in correspondence to a user ID for identifying the user who operates on the second terminal apparatus, if the user authentication is successfully executed; and
   processing such that the edited information stored in the memory in correspondence to the valid authentication ID is displayed in the second terminal apparatus, if the determining step determines that the predetermined time has not elapsed, and processing such that unread portion of the information about the mail function is displayed in the second terminal apparatus using the user ID for identifying the user who operates on the second terminal apparatus, if the determining step determines that the predetermined time has elapsed.

3. A computer readable storage medium encoded with a computer program, the computer program comprising computer executable instructions for controlling a server apparatus to process information about a mail function edited by a user operating a first terminal apparatus in accordance with a password the user enters into a second terminal apparatus of a different type from the first terminal apparatus, the instructions comprising:

controlling a memory to store the edited information, a user ID for identifying the user and an authentication ID which is made invalid when a predetermined time has elapsed, in correspondence to each other;

executing a user authentication using the entered password;

determining whether the predetermined time has elapsed since the editing of the information about the mail function by discriminating whether a valid authentication ID exists in the memory in correspondence to a user ID for identifying the user who operates on the second terminal apparatus, if the user authentication is successfully executed; and processing such that the edited information stored in the memory in correspondence to the valid authentication ID is displayed in the second terminal apparatus, if the determining step determines that the predetermined time has not elapsed, and processing such that unread portion of the information about the mail function is displayed in the second terminal apparatus using the user ID for identifying the user who operates on the second terminal apparatus, if the determining step determines that the predetermined time has elapsed.

* * * * *